(12) United States Patent
Hiwatashi

(10) Patent No.: US 10,477,221 B2
(45) Date of Patent: Nov. 12, 2019

(54) IMAGE PROCESSING APPARATUS FOR CONTROLLING IMAGE QUALITY OF A SPECIFIC REGION IN AN IMAGE WHILE MINIMIZING DELAY OF THE ENCODING PROCESS

(71) Applicant: CANON KABUSHIKI KAISHA, Tokyo (JP)

(72) Inventor: Saku Hiwatashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 119 days.

(21) Appl. No.: 15/651,919

(22) Filed: Jul. 17, 2017

(65) Prior Publication Data

US 2018/0027242 A1   Jan. 25, 2018

(30) Foreign Application Priority Data

Jul. 22, 2016   (JP) .................................. 2016-144312

(51) Int. Cl.
*H04N 19/17* (2014.01)
*H04N 19/137* (2014.01)
*H04N 19/167* (2014.01)
*H04N 19/124* (2014.01)
*H04N 19/85* (2014.01)
*H04N 19/20* (2014.01)

(52) U.S. Cl.
CPC ........... *H04N 19/17* (2014.11); *H04N 19/124* (2014.11); *H04N 19/137* (2014.11); *H04N 19/167* (2014.11); *H04N 19/85* (2014.11); *H04N 19/20* (2014.11)

(58) Field of Classification Search
None
See application file for complete search history.

(56) References Cited

U.S. PATENT DOCUMENTS

| 9,008,358 | B2 * | 4/2015 | Naito | H04N 19/55 382/103 |
| 10,123,021 | B2 * | 11/2018 | Hiwatashi | H04N 19/176 |
| 2012/0294480 | A1 * | 11/2012 | Naito | H04N 19/55 382/103 |
| 2014/0369617 | A1 * | 12/2014 | Hiwatashi | H04N 19/176 382/239 |
| 2016/0255370 | A1 * | 9/2016 | Shimizu | H04N 19/597 375/240.16 |

FOREIGN PATENT DOCUMENTS

JP   2578986 B2   2/1997

* cited by examiner

*Primary Examiner* — Tahmina N Ansari
(74) *Attorney, Agent, or Firm* — Canon U.S.A., Inc. IP Division

(57) ABSTRACT

In order to appropriately control the image quality of an intended specific region in an image without delaying an encoding process, an image processing apparatus includes a determination unit configured to determine a specific region in a first image targeted for the encoding process on the basis of (a) a time difference between a first time associated with the first image and a second time associated with a second image in which an object has been detected by a detection unit before the encoding process is executed on the first image, and (b) information on a region corresponding to the object detected by the detection unit in the second image, and executes, on the first image, the encoding process of varying image quality between a region corresponding to the specific region determined by the determination unit, and any other region.

14 Claims, 19 Drawing Sheets

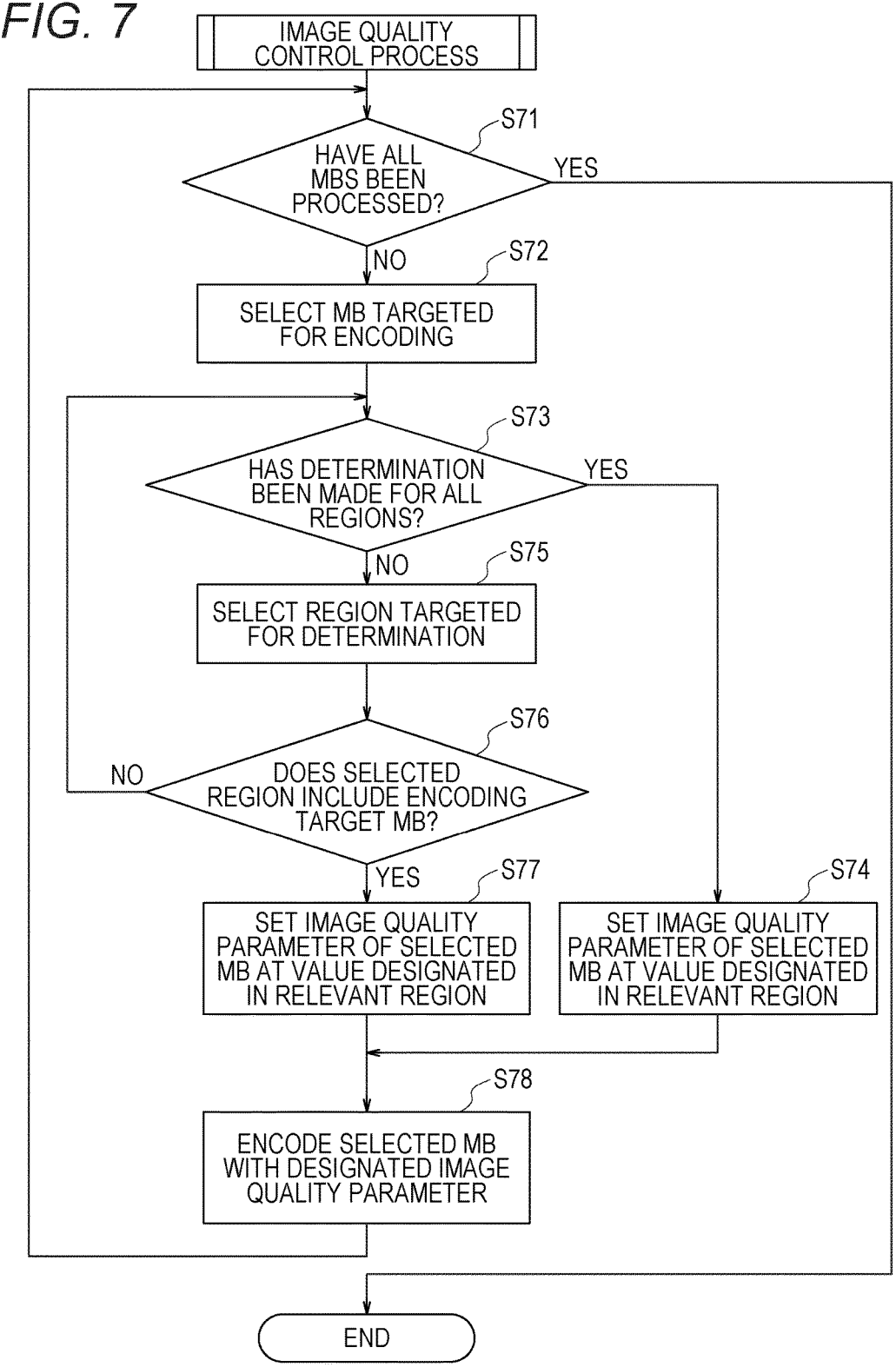

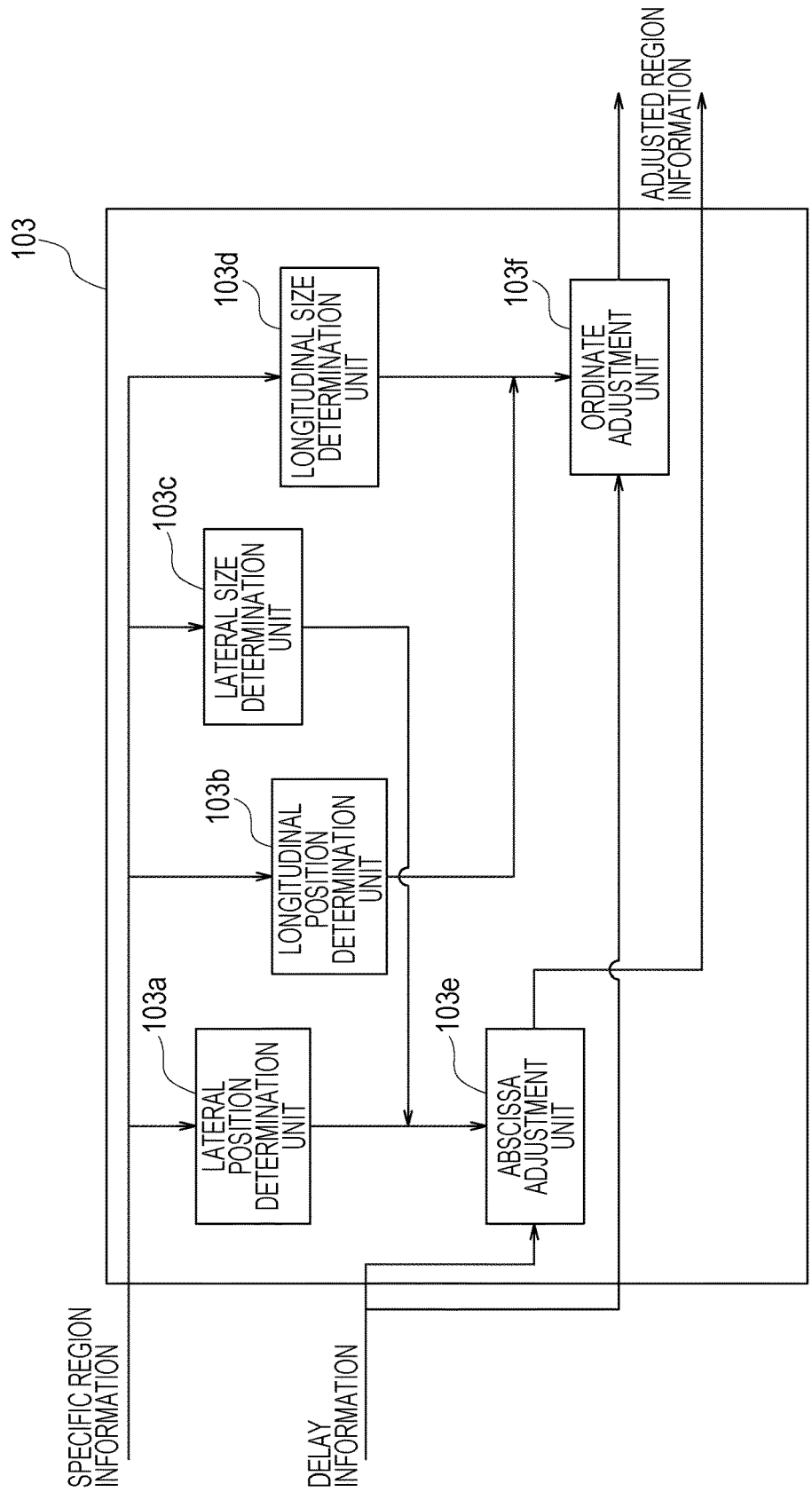

Table C $\{c_{0,0},...,c_{m-1,n-1}\}$

|  | 0 | $X_{Th1}$ | $X_{Th2}$ $X_{Thm-1}$ | $X_{max}$ |
|---|---|---|---|---|
|  | $c_{0,0}$ | $c_{1,0}$ | ... | $c_{m-1,0}$ |
| $Y_{Th1}$ | | | | |
|  | $c_{0,1}$ | $c_{1,1}$ | ... | $c_{m-1,1}$ |
| $Y_{Th2}$ | | | | |
| $Y_{Thn-1}$ | ⋮ | ⋮ | | ⋮ |
|  | $c_{0,n-1}$ | $c_{1,n-1}$ | ... | $c_{m-1,n-1}$ |
| $Y_{max}$ | | | | |

FIG. 18A

Table1

|   | $X_{Th1}$ | $X_{Th2}$ | $X_{max}$ |
|---|---|---|---|
| $Y_{Th1}$ | 0 | 0 | 0 |
| $Y_{Th2}$ | 1 | 0 | 1 |
| $Y_{max}$ | 2 | 1 | 2 |

Table2

| 0 | 0 | 0 |
|---|---|---|
| 2 | 0 | 2 |
| 4 | 2 | 4 |

Table3

| 0 | 0 | 0 |
|---|---|---|
| 3 | 0 | 3 |
| 6 | 3 | 6 |

FIG. 18B

Table1

|   | $X_{Th1}$ | $X_{Th2}$ | $X_{max}$ |
|---|---|---|---|
| $Y_{Th1}$ | 1 | 1 | 1 |
| $Y_{Th2}$ | 0 | 1 | 0 |
| $Y_{max}$ | 2 | 2 | 2 |

Table2

| 1 | 1 | 1 |
|---|---|---|
| 0 | 1 | 0 |
| 4 | 4 | 4 |

Table3

| 1 | 1 | 1 |
|---|---|---|
| 0 | 2 | 0 |
| 6 | 6 | 6 |

IMAGE PROCESSING APPARATUS FOR CONTROLLING IMAGE QUALITY OF A SPECIFIC REGION IN AN IMAGE WHILE MINIMIZING DELAY OF THE ENCODING PROCESS

BACKGROUND OF THE INVENTION

Field of the Invention

The present invention relates to an image processing apparatus, an image processing method, and a program.

Description of the Related Art

In recent years, a technology for controlling the quality of an image by changing a compression ratio according to the region in the image is known in a video compression/encoding field.

Japanese Patent No. 2578986 discloses a point that each block obtained by dividing an image is determined whether or not to be a main part and an image signal is encoded in such a manner as to make the definition of the main part high. Consequently, for example, an entire image of a monitoring camera can be recorded at a low bitrate for long-time recording while the face and motion of a person can be captured in the image with high quality.

However, when a specific region where image quality is not reduced and a non-specific region where image quality may be reduced are detected in an image with high accuracy, a burden of the process of detecting the specific region is heavy, and a delay of several frames occurs before the specific region is detected for an encoding process. Hence, the specific region detected by the detection process may be different from an actual specific region, which is targeted for the encoding process, in the image. Even if an image quality parameter (quantization value) is changed for the specific region detected by the detection process, image quality cannot be controlled as intended. A method for delaying the encoding process and synchronizing with the completion of the detection process of the specific region is also conceivable. However, there is an issue in the delay of the encoding process that the method is not suitable for a monitoring application that requires real time performance.

Thus, there is a need to appropriately control the image quality of an intended specific region in an image without delaying the encoding process.

SUMMARY OF THE INVENTION

In order to solve the above issue, an image processing apparatus according to an aspect of the present invention includes: a detection unit configured to detect a specific region in an image; an encoding unit configured to execute an encoding process on the image; and a determination unit configured to determine a specific region in a first image targeted for the encoding process, on the basis of delay information between the first image and a second image in which a specific region has been detected by the detection unit before the encoding process is executed on the first image, and information on the specific region in the second image, and the encoding unit executes, on the first image, the encoding process of varying image quality between a region corresponding to the specific region detected by the determination unit, and any other region.

Further features of the present invention will become apparent from the following description of exemplary embodiments (with reference to the attached drawings).

BRIEF DESCRIPTION OF THE DRAWINGS

FIG. 7 is a flowchart illustrating a procedure of an image quality control process.

FIG. 8 is a block diagram illustrating the configuration of a determination unit of a second embodiment.

FIGS. 18A and 18B are examples of the reference table.

DESCRIPTION OF THE EMBODIMENTS

Embodiments of the present invention are described in detail hereinafter with reference to the accompanying drawings.

The embodiments described below are examples as means for realizing the present invention. The embodiments should be corrected or changed, as appropriate, according to the configuration of an apparatus to which the present invention is applied and various conditions. The present invention is not intended to be limited to the embodiments below.

Figure 1:
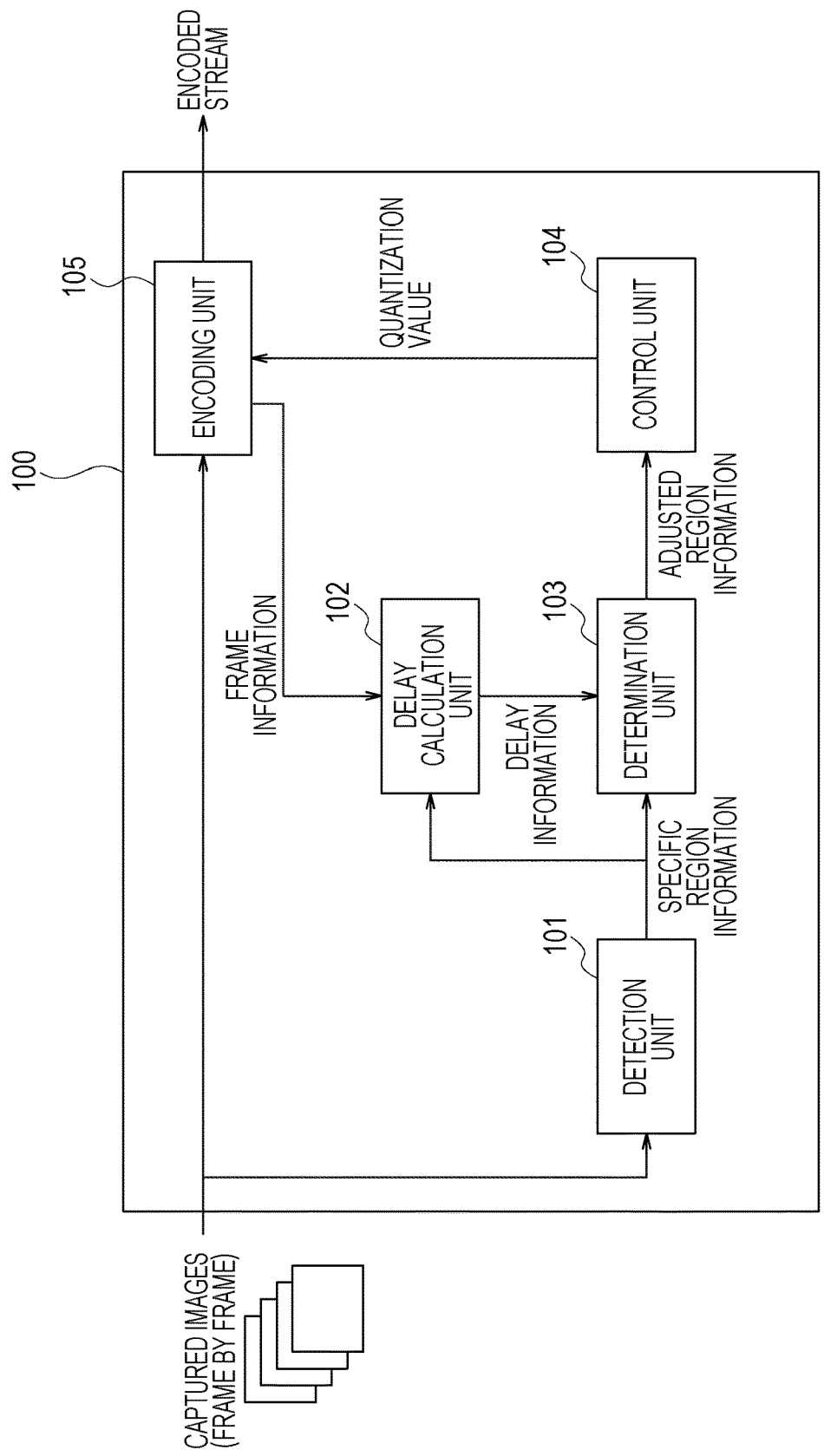
FIG. 1 is a block diagram illustrating an example of the configuration of an image processing apparatus.

FIG. 1 is a block diagram illustrating an example of the configuration of an image processing apparatus 100. The image processing apparatus 100 is an apparatus that performs a compression/encoding process (hereinafter also simply referred to as the "encoding process") on an image to transmit, store, and play back moving images. In the embodiment, a device such as a personal computer (PC) connected to an imaging device may be operated as the image processing apparatus 100, or the imaging device may be operated as the image processing apparatus 100. The imaging device is here a monitoring video camera that captures a plurality of images (frames) continuously on a time-series basis, or the like. The image processing apparatus 100 performs the encoding process on an image (captured image) to output an encoded stream.

In the application as the monitoring camera, a relatively low bitrate is used for encoding to reduce the size of encoded data in many cases since long-time recording is required. However, encoding at a low bitrate causes the loss of a large amount of information to degrade image quality. There may then arise a problem that the intended application is not achieved by, for example, making it impossible to identify the face of a person. Hence, in the embodiment, an entire image is not uniformly encoded. An important region such as the face of a person is detected as a specific region. The image is divided into the specific region and a non-specific region excluding the specific region. Encoding is performed in such a manner that image quality is reduced in the non-specific region so as to reduce the amount of encoded data, while image quality is not reduced in the specific region.

The image processing apparatus 100 performs the encoding process on each block (macroblock) obtained by dividing an image targeted for encoding into rectangular small regions. At this point in time, the image processing apparatus 100 changes a quantization value on a block basis to perform the encoding process in such a manner that the image quality is reduced in the non-specific region in the image, while the image quality is not reduced in the specific region. The method of the encoding process is not especially limited, and can use a coding method stipulated by an ITU-T recommendation and an ISO/IEC standard. For example, a method such as MPEG-2, H.264, or HEVC can be used as the encoding method. In the specification, ITU-T Rec. H.264 Advanced Video Coding|ISO/IEC International Standard 14496-10 (MPEG-4 AVC) is simply referred to as H.264.

As illustrated in FIG. 1, the image processing apparatus 100 includes a detection unit 101, a delay calculation unit 102, a determination unit 103, a control unit 104, and an encoding unit 105.

The detection unit 101 performs a detection process of analyzing a captured image and detecting a specific region in the image. The specific region is here an important region in the image, and is a region including, for example, an object (such as the face of a person) being a monitoring target. The detection unit 101 outputs information related to the detected specific region as specific region information, to the delay calculation unit 102 and the determination unit 103. The specific region information includes at least one of the position and the size of the specific region in the image, and frame information (time information) of the image in which the specific region has been detected. Moreover, the specific region information may include at least one of the direction and the speed of movement of the specific region in the image.

Figure 2:
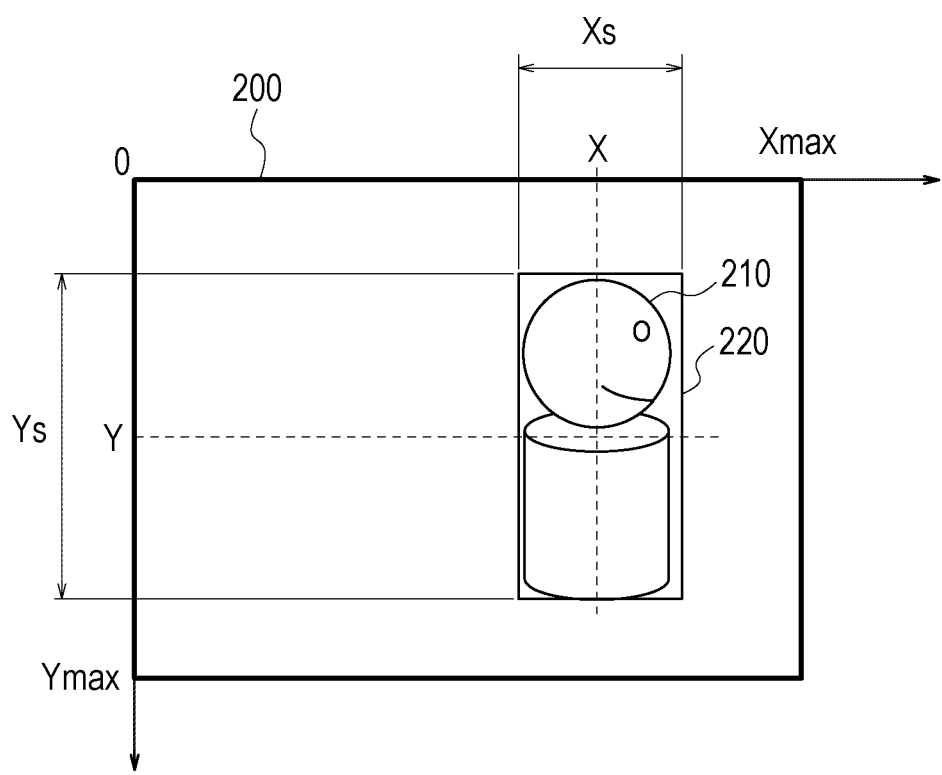
FIG. 2 is an explanatory view of specific region information.

FIG. 2 is an explanatory view of the specific region information. FIG. 2 illustrates a case where a person 210 is present in an image 200, and a rectangular region including the person 210 has been detected as a specific region 220 by the detection unit 101. Moreover, in FIG. 2, the number of pixels in the lateral direction of the image 200 is Xmax, and the number of pixels in the longitudinal direction is Ymax. In this case, coordinates (X, Y) indicating a center position of the specific region 220 can be used as a position of the specific region 220 in the image. Moreover, the product of a lateral size Xs and a longitudinal size Ys of the specific region 220 can be used as the size of the specific region 220.

However, the specific region is not limited to the rectangular shape as in the specific region 220 of FIG. 2, and can be of any shape. Moreover, the position of the specific region in the image is not limited to the center position of the specific region, and is simply required to be a position that allows the identification of the position of the specific region such as the position of the barycenter of the specific region. Furthermore, the size of the specific region occupying in the image is not limited to the product of the lateral size Xs and the longitudinal size Ys of the specific region, and may be indicated by the number of macroblocks occupying the specific region.

Return to FIG. 1. The delay calculation unit 102 calculates a time difference between an image targeted by the detection unit 101 for the detection process, and an image targeted by the encoding unit 105 for the encoding process (a time difference in image capture). The detection unit 101 and the encoding unit 105 each sequentially process a plurality of images captured continuously on a time-series basis. However, a processing time delay occurs between the detection process and the encoding process. The delay calculation unit 102 calculates information indicating the time delay as delay information. Specifically, the delay calculation unit 102 calculates the delay information from the frame information included in the specific region information obtained from the detection unit 101, and frame information of an image targeted for the encoding process and obtained from the encoding unit 105.

In other words, the delay information is information indicating a frame delay amount between a first image being an image targeted for the encoding process, and a second image being an image where a specific region has been detected by the detection process before the encoding process is executed on the first image. The delay calculation unit 102 outputs the calculated delay information to the determination unit 103.

The determination unit 103 determines, from the specific region information obtained from the detection unit 101 and the delay information obtained from the delay calculation unit 102, which position in the image targeted for the encoding process is finally regarded as the specific region to enhance the image quality. Specifically, the determination unit 103 adjusts the specific region detected by the detection unit 101 on the basis of the specific region information and the delay information, and outputs, to the control unit 104, the adjusted region information being information indicating the adjusted specific region. The processing in the determination unit 103 is described below.

The control unit 104 generates a quantization value in the image on the basis of the adjusted region information output from the determination unit 103, and outputs it to the encoding unit 105. The encoding unit 105 outputs the frame information of the image targeted for the encoding process to the delay calculation unit 102, and also performs the encoding process on the image with the quantization value obtained from the control unit 104 to output an encoded stream.

Figure 3A:
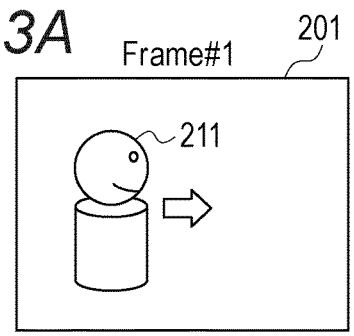
FIGS. 3A to 3E are explanatory views of an adjustment process for a specific region.
Figure 3B:
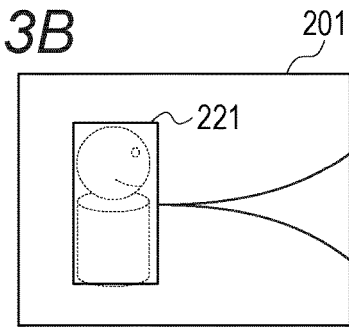

An overview of the processing in the determination unit 103 of the image processing apparatus 100 is described here. If there is a person at a position 211 in an image 201 at frame number=1 as illustrated in FIG. 3A, the detection unit 101 obtains a result illustrated in FIG. 3B by the detection process for the image 201. In other words, the detection unit 101 obtains a specific region 221 including the person in the image 201 as illustrated in FIG. 3B. The specific region is here a region indicated by a rectangular shape. However, the shape of the specific region is not limited to the rectangular shape, and can be of any shape.

When the person moves afterward, the position of the person moves to a position 212 in an image 202 of frame number=2, which is a temporally subsequent image. If the encoding unit 105 performs the encoding process on the image 202 of frame number=2, the detection unit 101 may not yet have obtained a detection result for the image 202 of frame number=2 being the same frame at this point in time. Detection results available at this point in time are assumed to be only the detection result for the image 201 of frame number=1 being the past frame. In this case, the detection result for the image 201 is used as it is for the encoding process for the image 202 of frame number=2.

Figure 3C:
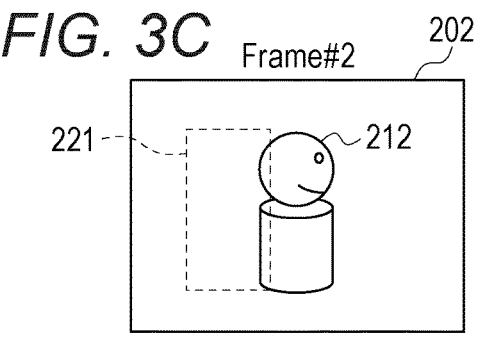

However, if the detection result for the image 201 is applied as it is to the image 202 of frame number=2, the specific region 221 becomes a rectangular region indicated by a dotted line of FIG. 3C. In other words, the specific region 221 deviates from the position 212 of the person in the image 202. Hence, if the encoding process is performed on the image 202 using the specific region 221 obtained by the detection process for the image 201, image quality control cannot be performed, appropriately differentiating the specific region (person) and a non-specific region excluding the specific region in the image 202.

The most positive method to solve this is to delay the start of the encoding process for the image 202 until the detection result for the image 202 of frame number=2 is obtained. However, a buffer memory in which delayed frames' images are stored is newly required to delay the process. Moreover, the output of an encoded stream obtained in the end is delayed; accordingly, it is not suitable for the monitoring application that requires real time performance, and the like.

Figure 3D:
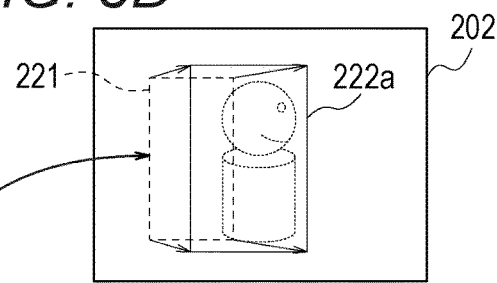
Figure 3E:
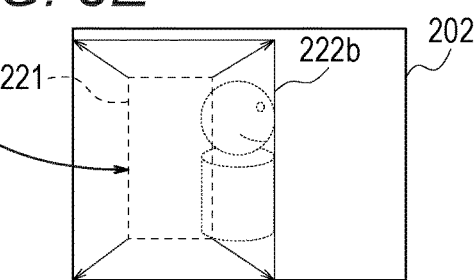

Hence, the image processing apparatus 100 in the embodiment causes the determination unit 103 to adjust a specific region that has been obtained by the time the encoding process is performed to eliminate the necessity of an additional buffer memory and a delay in output. Specifically, the determination unit 103 moves the specific region 221 as illustrated in FIG. 3D to set a specific region 222a including the person in the image 202, or enlarges the specific region 221 as illustrated in FIG. 3E to set a specific region 222b.

In this manner, the determination unit 103 adjusts a specific region that was detected by the detection process for an image captured before an image targeted for the encoding process to estimate a specific region (a region including a person) in the image targeted for the encoding process. The specific region adjusted by the determination unit 103 is then applied to the image targeted for the encoding process for image quality control that enhances the image quality of a region corresponding to the specific region.

Figure 4:
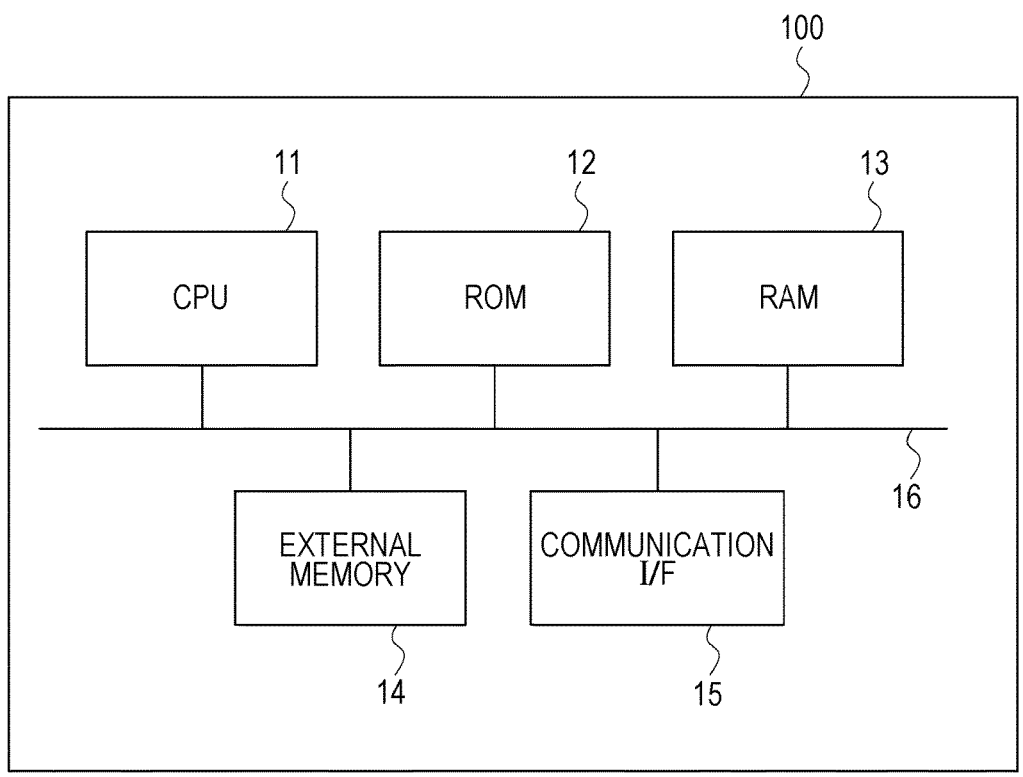
FIG. 4 is a diagram illustrating an example of a hardware configuration of the image processing apparatus.

FIG. 4 is a diagram illustrating a hardware configuration of the image processing apparatus 100.

The image processing apparatus 100 includes a CPU 11, a ROM 12, a RAM 13, an external memory 14, a communication I/F 15, and a system bus 16.

The CPU 11 controls the overall operation of the image processing apparatus 100, and controls the configuration units (12 to 15) via the system bus 16. The ROM 12 is a nonvolatile memory in which programs necessary for the CPU 11 to execute processes is stored. The programs may be stored in the external memory 14 or a detachable storage medium (not illustrated). The RAM 13 functions as a main memory and a work area of the CPU 11. In other words, the CPU 11 achieves various functional operations by loading a necessary program from the ROM 12 into the RAM 13 upon execution of a process and executing the loaded program.

Various pieces of data and information that are necessary for the CPU 11 to perform a process using a program are stored in the external memory 14. Moreover, various pieces of data and information that are obtained by the CPU 11 performing a process using a program are stored in the external memory 14. The communication I/F 15 is an interface for communicating with an external apparatus. The communication I/F 15 is, for example, a LAN interface. The system bus 16 connects the CPU 11, the ROM 12, the RAM 13, the external memory 14, and the communication I/F 15 in such a manner as to be able to communicate with each other.

The function of each unit of the image processing apparatus 100 illustrated in FIG. 1 can be achieved by the CPU 11 executing a program. However, at least part of the units of the image processing apparatus 100 illustrated in FIG. 1 may be configured in such a manner as to operate as dedicated hardware. In this case, the dedicated hardware operates on the basis of the control of the CPU 11.

Figure 5:
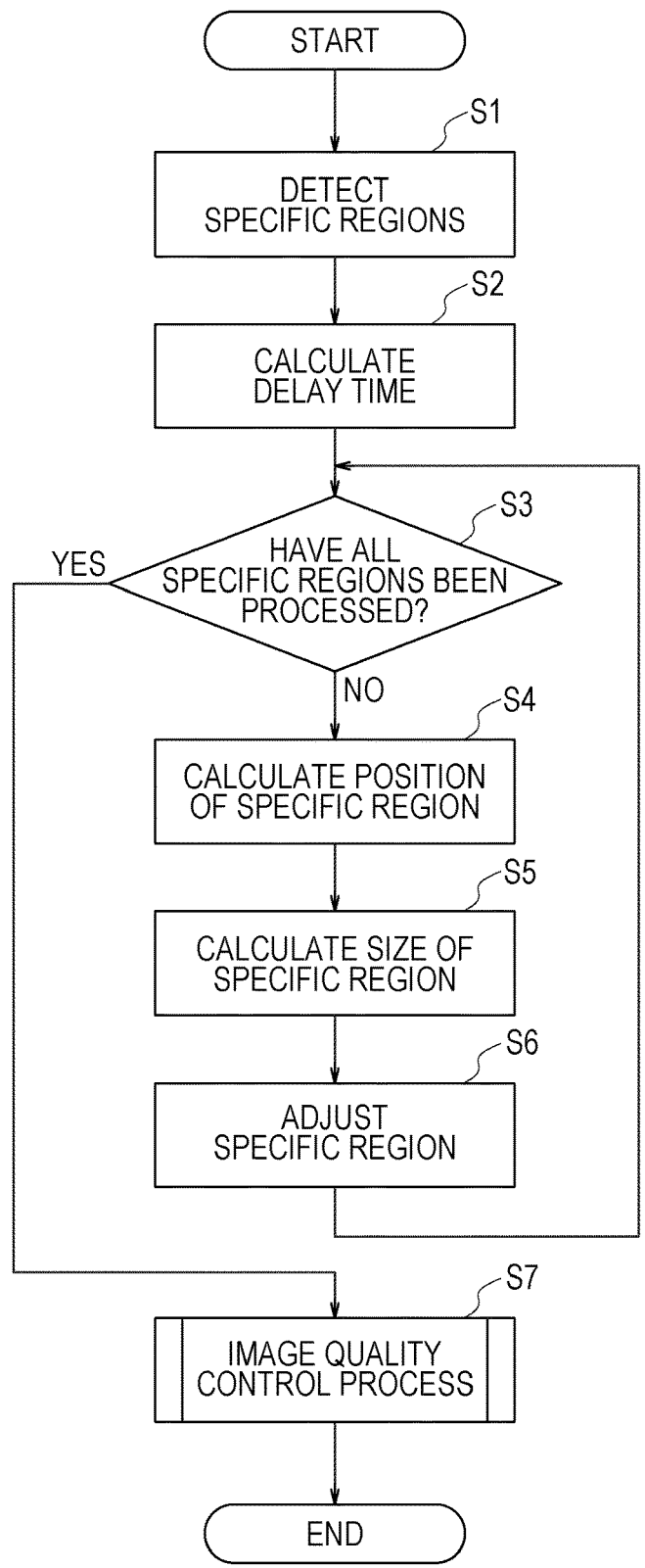
FIG. 5 is a flowchart illustrating image processing to be executed by the image processing apparatus.

The procedure of processing to be executed in the image processing apparatus 100 is described below with reference to FIG. 5. The processing illustrated in FIG. 5 is started, for example, at the timing when an image targeted for processing is input. However, the timing to start the processing of FIG. 5 is not limited to the above timing. The CPU 11 reads and executes a necessary program; accordingly, the image processing apparatus 100 can achieve the processing illustrated in FIG. 5.

However, it may be configured in such a manner that at least part of the elements of the image processing apparatus 100 illustrated in FIG. 1 operates as dedicated hardware to achieve the processing of FIG. 5. In this case, the dedicated hardware operates on the basis of the control of the CPU 11. Alphabet S is assumed below to indicate a step in the flowchart.

Firstly, in S1, the detection unit 101 executes the detection process, detects specific regions from an image targeted for processing, and outputs specific region information. Next, in S2, the delay calculation unit 102 calculates a time difference between the detection process and the encoding process on the basis of frame information of the image targeted for the detection process of S1, and frame information of an image that is to be encoded, and outputs the time difference as delay information.

In S3, the determination unit 103 determines whether or not the adjustment process has been completed for all the specific regions detected in S1 in the image. If there is a specific region for which the adjustment process has not been completed, the determination unit 103 selects the unprocessed specific region as a specific region targeted for the adjustment process, and then moves to S4. On the other hand, if the number of specific regions detected in S1 is zero, or if the adjustment process has been completed for all the specific regions, the determination unit 103 moves to S7.

In S4, the determination unit 103 acquires the position of the specific region targeted for the adjustment process in the image from the specific region information, and moves to S5. In S5, the determination unit 103 acquires a size of the specific region targeted for the adjustment process, the size occupying in the image, from the specific region information, and moves to S6. In S6, the determination unit 103 adjusts the specific region targeted for the adjustment process on the basis of the delay information calculated in S2, information indicating the position of the specific region acquired in S4, and information indicating the size of the specific region acquired in S5. The specific correction method is described below. The determination unit 103 repeats the processing from S4 to S6 the number of times equal to the number of specific regions. When the adjustment process has been completed for all the specific regions in the image, the control unit 104 controls image quality (determines a quantization value) in S7 on a block basis on the basis of the adjusted specific region. The encoding unit 105 then encodes the image in accordance with the image quality control of the control unit 104. The specific method for the image quality control process in S7 is described below.

The adjustment process for a specific region in the embodiment is specifically described below. In the embodiment, a correction based on delay information and a correction based on position information of a specific region are made as the adjustment process for a specific region.

Firstly, the correction based on delay information is described. It is considered that as the time difference between an image in which a specific region has been obtained, and an image that is to be encoded is increased, a person (the specific region) in the image has moved largely in the image. Hence, the correction amount of the specific region is increased as the time difference is increased. The method for adjusting a specific region includes at least one of movement and enlargement of a specific region illustrated in FIGS. 3D and 3E. In other words, as the time difference is increased, the amount of movement of the specific region and/or the amount of the enlargement of the specific region can be increased.

Furthermore, when the direction and speed of movement of the specific region can be acquired from, for example, a record of a past detection result upon the correction of the specific region, the determination unit 103 may determine the amount and direction of movement of the specific region on the basis of the acquired movement information and delay information to move the specific region. At this point in time, the amount of enlargement of the specific region may be determined on the basis of the movement information and the delay information to enlarge the specific region in addition to moving the specific region. When, for example, the direction of movement of the specific region is down on a screen, it is judged that the person is moving closer to the monitoring camera as the image processing apparatus 100, and the adjustment process of enlarging the specific region is performed. Moreover, when the direction of movement of the specific region is up on the screen, it is judged that the person is moving farther from the monitoring camera as the image processing apparatus 100, and the adjustment process of reducing the size of the specific region is performed. When the information on the direction and speed of movement of the specific region cannot be acquired, the specific region may be enlarged without being moved.

Next, the correction based on position information of a specific region is described with reference to FIGS. 6A and 6B.

Figure 6A:
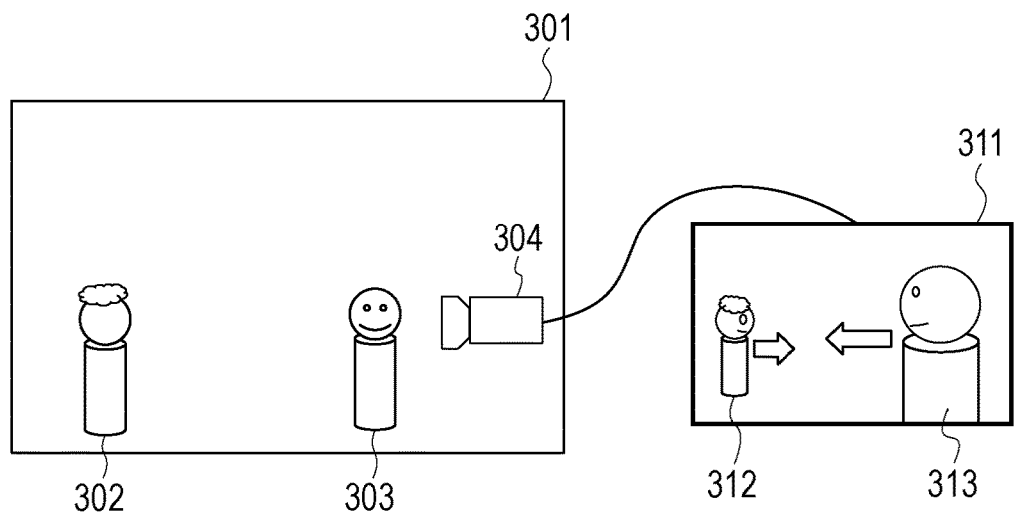
FIGS. 6A and 6B are explanatory views of the adjustment process based on the specific region information.

When subjects 302 and 303 are captured with a camera 304 in a real space 301 as illustrated in FIG. 6A, the subjects 302 and 303 are captured as detection targets 312 and 313 in a captured image 311. In this manner, the detection target 313 corresponding to the subject 303 located closer to the camera 304 in the real space 301 occupies a larger area in the captured image 311.

Moreover, when the subjects 302 and 303 move at substantially the same speed in the real space 301, the detection target 313 corresponding to the subject 303 closer to the camera 304 moves more in the captured image 311 than the detection target 312 corresponding to the subject 302. In other words, it is considered that a detection target occupying a larger area in the captured image 311 moves faster.

Figure 6B:
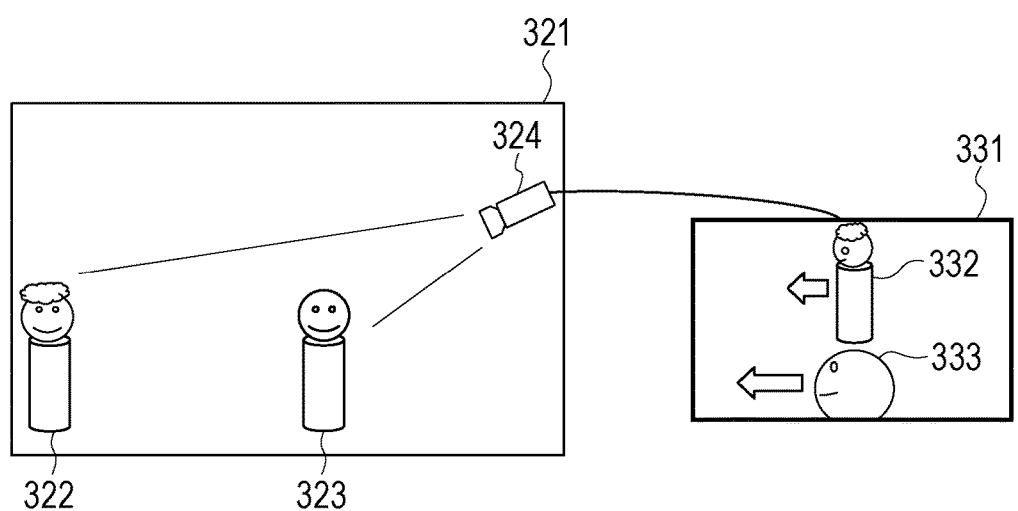

Moreover, when subjects 322 and 323 are captured with a camera 324 in a real space 321 as illustrated in FIG. 6B, the subjects 322 and 323 are captured as detection targets 332 and 333 in a captured image 331. In the example of FIG. 6B, the subject 323 is located closer to the camera 324 than the subject 322. However, the detection target 333 corresponding to the subject 323 in the captured image 331 corresponds only to an upper part (the head) of the subject 323, and the distance to the subject cannot be judged only from the size of the detection target.

In such a case, attention is given to the fact that the camera 324 is fixed, and a position where the subject appears is limited (the subject is a person, and is normally only on the lower side, not on the upper side, of the real space 321 as long as the person is walking). It is possible to judge that the subject corresponding to the detection target 333 located on the lower side of the captured image 331 is at a position closer to the camera than the subject corresponding to the detection target 332 located on the upper side, considering the above-mentioned limitation. In other words, the detection target located on the lower side of the captured image 331 is considered to move faster.

Hence, the determination unit 103 may vary the adjustment process according to the position information (the size and position in an image) of a specific region, using the above-mentioned characteristic. Specifically, considering the place of installation of the camera and a target for image capture, the positional relationship between a subject corresponding to a detection target and the camera is determined on the basis of the position information of the specific region. The closer to the camera the subject is, the larger the correction amount (the amount of movement or the amount of enlargement) of the specific region. At this point in time, the direction and speed of movement of the specific region may be acquired to determine the amount and direction of movement of the specific region on the basis of the acquired movement information as in the above-mentioned correction based on delay information.

The image quality control process executed in S7 of FIG. 5 is specifically described below with reference to FIG. 7. In the image quality control process, an image is divided into small rectangular regions called macroblocks. An image quality parameter (quantization value) is changed on a macroblock basis to perform the encoding process of making the image quality of a specific region high, making the image quality of a non-specific region low, and accordingly reducing the data amount of the non-specific region.

Firstly, in S71, the control unit 104 determines whether or not the image quality control process has been completed for all the macroblocks (MB) in the image. If not completed, the control unit 104 moves to S72. If completed, the process is ended. In S72, the control unit 104 selects one unprocessed macroblock as a macroblock targeted for processing, and moves to a region determination process of S73 to S75. The region determination process is a process of determining whether or not the macroblock targeted for processing is included in the specific region. The region determination process is performed, specific region-by-specific region, in the image.

In S73, the control unit 104 determines whether or not the determination on whether or not the macroblock targeted for processing is included in the specific region has been made for all the specific regions in the image. If there is no specific region in the image, or if having determined that the above determination has been made for all the specific regions, then the control unit 104 moves to S74. If having determined that there are undetermined specific regions, the control unit 104 moves to S75. In S74, the control unit 104 sets a quantization value of the macroblock targeted for processing at a predetermined value for the non-specific region, and moves to S78. The quantization value for the non-specific region is assumed to be designated in advance for each image (frame).

In S75, the control unit 104 selects one specific region targeted for the determination from the undetermined specific regions, and moves to S76. In S76, the control unit 104 determines whether or not the macroblock targeted for processing is included in the specific region selected in S75. If having determined that the macroblock targeted for processing is not included in the specific region being selected, then the control unit 104 returns to S73. If having determined that the macroblock targeted for processing is included in the specific region being selected, the control unit 104 moves to S77.

In S77, the control unit 104 sets a quantization value of the macroblock targeted for processing at a predetermined value for the specific region, and moves to S78. The quantization value for the specific region is here a value weighted to enhance the image quality of the specific region, and is assumed to be designated in advance for each image (frame).

The control unit 104 repeats the process of S73 to S75 until completing the determination process for all the specific regions. In S78, the encoding unit 105 then encodes the macroblock targeted for processing with the quantization value designated in S77 or S78. The above processing is performed on all the macroblocks in the image to encode macroblocks belonging to the specific region with high image quality, and encode macroblocks belonging to the non-specific region excluding the specific region with low image quality.

As described above, the image processing apparatus 100 in the embodiment sequentially executes the detection process of detecting a specific region in an image and an encoding process of executing the encoding process on the image, on a plurality of images continuous on a time-series basis. At this point in time, the image processing apparatus 100 calculates delay information between a first image targeted for the encoding process and a second image where a specific region has been detected by the detection process before the encoding process is executed on the first image. Moreover, the image processing apparatus 100 adjusts the specific region in the second image on the basis of the delay information and information related to the specific region in the second image. The image processing apparatus 100 then executes, on the first image, the encoding process of making a region corresponding to the adjusted specific region different in image quality from a region excluding the region.

In this manner, the image processing apparatus 100 can estimate a specific region in an image targeted for the encoding process on the basis of a past specific region detection result that has been obtained by the time the encoding process is executed. Therefore, even if the detection process for the specific region is delayed for the encoding process, it is possible to appropriately control the image quality of an intended specific region in an image without delaying the encoding process and requiring an additional buffer memory. In other words, even if a detection target (recognition object) is moving, the image quality of the detection target (recognition object) can be appropriately enhanced.

Moreover, in the embodiment, the image processing apparatus 100 can estimate a specific region in an image targeted for the encoding process on the basis of the latest of past specific region detection results that have been obtained by the time the encoding process is executed. Hence, the specific region can be appropriately estimated.

Furthermore, the image processing apparatus 100 can use at least one of the position and the size of a specific region in an image, the specific region having been detected by the detection process, as a metric of the adjustment process for the specific region. A detection target in the image corresponding to a subject being at a position closer to a camera moves more in the image than a detection target in the image corresponding to a subject being at a position farther from the camera, the subject moving at the same speed. The positional relationship between the corresponding subject and the camera can be grasped on the basis of at least one of the position and the size of the specific region in the image. Accordingly, the specific region can be appropriately adjusted.

The image processing apparatus 100 may further use at least one of the direction and the speed of movement of the specific region in the image as a metric of the adjustment process for the specific region. In this case, the specific region can be adjusted with higher accuracy.

The image processing apparatus 100 adjusts at least one of the size and the position of a specific region upon the correction of the specific region. In other words, the adjustment process for a specific region includes at least one of the enlargement process and the movement process for the specific region. The image processing apparatus 100 can increase the correction amount (the amount of enlargement, the amount of movement) of the specific region as a delay of the second image for the first image is increased. Therefore, the specific region can be appropriately adjusted.

As described above, the image processing apparatus 100 in the embodiment can appropriately control the image quality of an intended specific region in an image without delaying the encoding process.

Second Embodiment

Next, a second embodiment of the present invention is described.

In the second embodiment, a description is given of a case where the correction amounts of a specific region are determined individually in a lateral direction (X direction) and a longitudinal direction (Y direction), on the basis of the position and size of the specific region.

An entire configuration of an image processing apparatus 100 in the embodiment is similar to the configuration illustrated in FIG. 1. Moreover, specific region information used in the embodiment is similar to the information illustrated in FIG. 2. The image processing apparatus 100 determines the correction amount of a specific region in the adjustment process on the basis of the specific region information and delay information, as in the above-mentioned first embodiment. However, in the image processing apparatus 100, the determination unit 103 performs processing differently from the above-mentioned first embodiment.

The determination unit 103 uses thresholds $Xs0$ and $Ys0$ of specific region sizes determined respectively for the lateral direction (X direction) and longitudinal direction (Y direction) of an image to perform the adjustment process on a specific region having a size equal to or greater than the threshold in such a manner as to increase the correction amount of the specific region. Moreover, the determination unit 103 performs the adjustment process on a specific region located in an edge region defined in an image in such a manner as to increase the correction amount of the specific region.

The edge region is here a region with a predetermined area including an edge position of the image, and is a region where at least one of coordinate values in the lateral direction (X direction) and the longitudinal direction (Y direction) of the image is equal to or less than a predetermined threshold, or equal to or greater than a predetermined threshold. In the embodiment, a description is given taking a region including all the edge positions of the image as the edge region. However, a region including at least part of the edge positions of the image may be set as the edge region. The edge region can be set, as appropriate, according to the place of installation of a camera and a target for image capture.

FIG. 8 is a block diagram illustrating an internal configuration of the determination unit 103 in the embodiment. The determination unit 103 includes a lateral position determination unit 103a, a longitudinal position determination unit 103b, a lateral size determination unit 103c, a longitudinal size determination unit 103d, an abscissa adjustment unit 103e, and an ordinate adjustment unit 103f.

The lateral position determination unit 103a determines whether or not the position of a specific region in the lateral direction (X direction) is at a position corresponding to the edge region of an image, on the basis of the coordinate value in the lateral direction of the specific region information obtained from the detection unit 101. The longitudinal position determination unit 103b determines whether or not the position of the specific region in the longitudinal direction (Y direction) is at a position corresponding to the edge region of the image, on the basis of the coordinate value in the longitudinal direction of the specific region information obtained from the detection unit 101.

Figure 9:
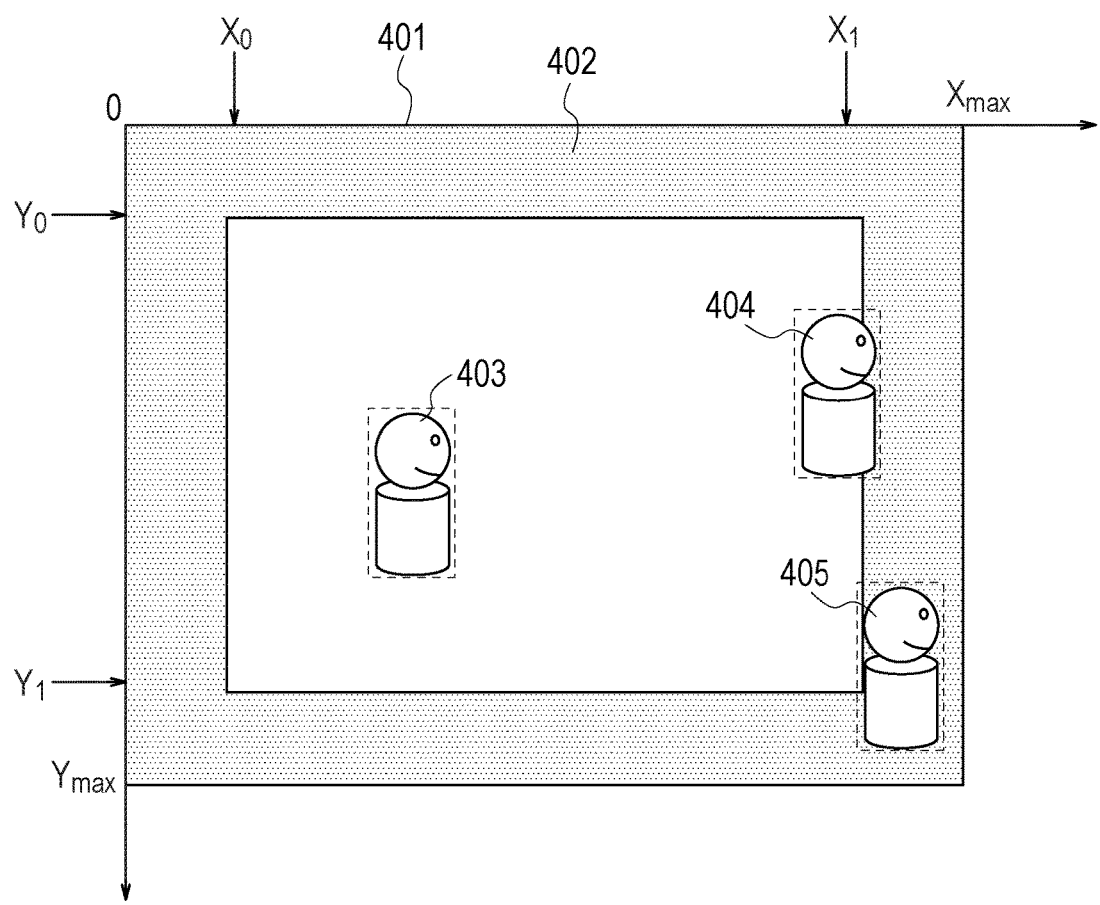
FIG. 9 is an explanatory view of an adjustment process in the second embodiment.

Specifically, the determination unit 103 sets an edge region 402 in an image 401 as illustrated in FIG. 9, and determines whether or not the specific region is within the edge region 402. The edge region 402 is a region defined by coordinate values X0 and X1 (X0<X1<Xmax) in the lateral direction, and coordinate values Y0 and Y1 (Y0<Y1<Ymax) in the longitudinal direction. If the coordinate values (X, Y) indicating the position of the specific region satisfies at least one of $X \leq X0$, $X \geq X1$, $Y \leq Y0$, and $Y \geq Y1$, the determination unit 103 determines that the specific region is within the edge region 402.

Return to FIG. 8. The lateral size determination unit 103c determines whether or not the size of the specific region in the lateral direction (X direction) is equal to or greater than a predetermined size, on the basis of information indicating the lateral size of the specific region information obtained from the detection unit 101. The longitudinal size determination unit 103d determines whether or not the size of the specific region in the longitudinal direction (Y direction) is equal to or greater than a predetermined size, on the basis of information indicating the longitudinal size of the specific region information obtained from the detection unit 101.

The abscissa adjustment unit 103e determines the adjustment amount of the specific region in the lateral direction, on the basis of delay information and the determination results of the lateral position determination unit 103a and the lateral size determination unit 103c, and adjusts the specific region in the lateral direction. The ordinate adjustment unit 103f determines the correction amount of the specific region in the longitudinal direction, on the basis of the delay information and the determination results of the longitudinal position determination unit 103b and the longitudinal size determination unit 103d, and adjusts the specific region in the longitudinal direction.

In the embodiment, the correction amount is changed, for example, according to a case where the specific region detected by the detection process is within the edge region 402, or a case where the specific region is outside the edge region 402. In a case of three specific regions 403 to 405 within the image 401 illustrated in FIG. 9, the specific region 403 is not included in the edge region 402, and the specific region 404 is not included in the edge region 402, since its center coordinate is outside the edge region 402. On the other hand, the specific region 405 is included in the edge region 402. In this case, the correction amount is increased only for the specific region 405.

Figure 10:
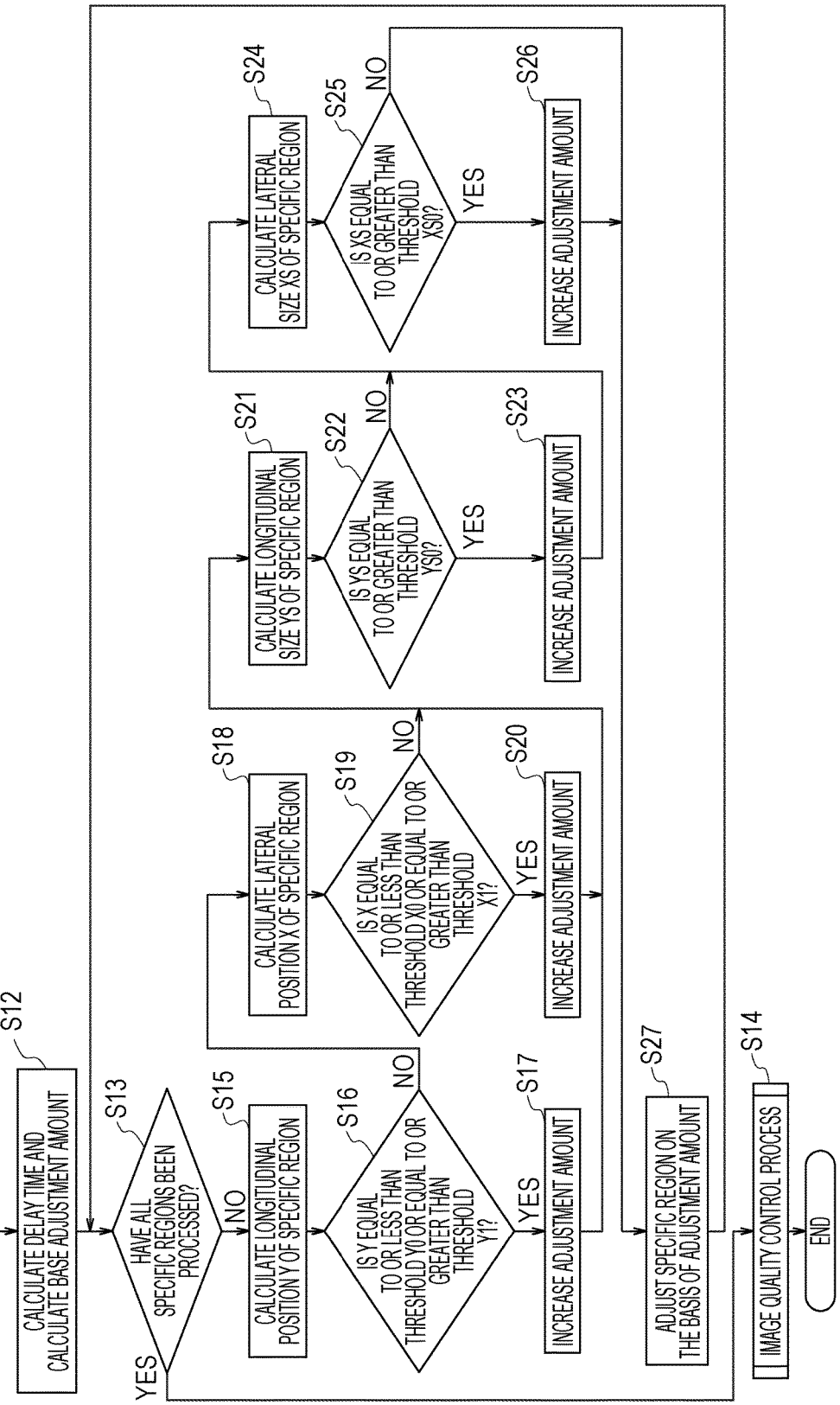
FIG. 10 is a flowchart illustrating image processing in the second embodiment.

The procedure of processing to be executed in the image processing apparatus 100 of the embodiment is described below with reference to FIG. 10. The processing illustrated in FIG. 10 is started at a timing similar to the above-mentioned processing illustrated in FIG. 5. The CPU 11 reads and executes a necessary program; accordingly, the image processing apparatus 100 can achieve the processing illustrated in FIG. 10.

However, it may be configured in such a manner that at least part of the elements of the image processing apparatus 100 illustrated in FIG. 1 operates as dedicated hardware to achieve the processing of FIG. 10. In this case, the dedicated hardware operates on the basis of the control of the CPU 11.

Firstly, in S11, the detection unit 101 executes the detection process, detects specific regions from an image targeted for processing, and outputs specific region information. Next, in S12, the delay calculation unit 102 calculates a time difference between the detection process and the encoding process on the basis of frame information of the image targeted for the detection process in S11 and frame information of an image that is to be encoded, and outputs the time difference as delay information. Moreover, in S12, the determination unit 103 determines a base correction amount being a base for the adjustment process for the specific region, on the basis of the delay information.

In S13, the determination unit 103 determines whether or not the adjustment process has been completed for all the specific regions in the image detected in S11. If the number of specific regions detected in S11 is zero, or if the adjustment process has been completed for all the specific regions, the determination unit 103 moves to S14. The process in S14 is similar to the above-mentioned process in S7 of FIG. 5 (the image quality control process of FIG. 7). On the other hand, if having determined in S13 that there is a specific region for which the adjustment process has not been completed, the determination unit 103 selects the unprocessed specific region as a specific region targeted for the adjustment process and moves to S15.

The determination unit 103 acquires a coordinate value Y in the longitudinal direction of the specific region targeted for the adjustment process in S15 from the specific region information, and determines in S16 whether or not the specific region is located in an edge region of the image, on the basis of the coordinate value Y. Specifically, as described with FIG. 9, the determination unit 103 determines whether or not the coordinate value Y is equal to or less than the threshold Y0, or equal to or greater than the threshold Y1.

If $Y \leq Y0$ or $Y \geq Y1$, then the determination unit 103 determines that the specific region is located in the edge region, and moves to S17. In S17, the determination unit 103 increases the correction amount as compared to the base correction amount, presuming that the specific region may have moved largely, and then moves to the process of determining the size of the specific region in S21 and subsequent steps. On the other hand, if Y0<Y<Y1, the determination unit 103 moves in S16 to the process of determining the position of the specific region in the lateral direction in S18 and subsequent steps.

The determination unit 103 acquires a coordinate value X in the lateral direction of the specific region targeted for the adjustment process in S18 from the specific region information, and determines in S19 whether or not the specific region is located in the edge region of the image on the basis of the coordinate value X. Specifically, as described with FIG. 9, the determination unit 103 determines whether or not the coordinate value X is equal to or less than the threshold X0, or equal to or greater than the threshold X1.

If X≤X0 or X≥X1, then the determination unit 103 determines that the specific region is located in the edge region and moves to S20. In S20, the determination unit 103 increases the correction amount as compared to the base correction amount, presuming that the specific region may have moved largely, and then moves to the process of determining the size of the specific region in S21 and subsequent steps. On the other hand, if X0<X<X1, the determination unit 103 determines in S19 that the specific region is not located in the edge region and moves to the process of determining the size of the specific region in S21 and subsequent steps.

In S21, the determination unit 103 acquires the longitudinal size Ys of the specific region targeted for the adjustment process from the specific region information, and determines in S22 whether or not the specific region is equal to or greater than the predetermined threshold Ys0, on the basis of the size Ys. If Ys≥Ys0, then the determination unit 103 moves to S23, increases the correction amount as compared to the base correction amount, presuming that the specific region may have moved largely, and moves to the process of determining the lateral size in S24 and subsequent steps. On the other hand, if Ys<Ys0, the determination unit 103 moves from S22 to the process of determining the lateral size in S24 and subsequent steps.

The determination unit 103 acquires the lateral size Xs of the specific region targeted for the adjustment process in S24 from the specific region information, and determines in S25 whether or not the specific region is equal to or greater than the predetermined threshold Xs0, on the basis of the size Xs. If Xs≥Xs0, then the determination unit 103 moves to S26, increases the correction amount as compared to the base correction amount, presuming that the specific region may have moved largely, and moves to S27. On the other hand, if Xs<Xs0, the determination unit 103 moves from S25 to S27.

In S27, the determination unit 103 adjusts the position and the size of the specific region, using the correction amounts that were increased (or were not increased) in S17, S20, S23, and S26, and returns to S13.

As described above, the image processing apparatus 100 in the embodiment determines thresholds for the size and the position of a specific region individually in the lateral direction and the longitudinal direction of an image, compares them with the sizes and the positions of the specific region, and accordingly determines the correction amounts of the specific region in the lateral direction and the longitudinal direction individually. Specifically, the image processing apparatus 100 increases the correction amounts as compared to the base correction amounts when the specific region is located in an edge region set with the thresholds in the image, and when the specific region is larger than a size set with the threshold.

In this manner, the correction amounts of a specific region can be determined, using the fact that as a subject is closer to a camera, its corresponding detection target is at a position closer to an edge position of an image, and the size in the image is increased. Therefore, it becomes possible to simplify computations required to estimate the specific region of the present on the basis of a past specific region detection result.

In the embodiment, a description has been given assuming that the determination on whether or not to increase the correction amount as compared to the base correction amount or leave the base correction amount as it is is made on the basis of a comparison using one threshold. However, the embodiment is not limited to the above description. For example, it may be configured in such a manner that a plurality of thresholds is prepared to determine a plurality of sizes such as "large", "medium", and "small", and the correction amount is increased as the specific region is increased in size. Moreover, it may be configured in such a manner that the distance to the edge is classified into a plurality of levels such as "close", "reasonably close", and "far", and the correction amount is increased as the specific region is closer to the edge position of the image.

Third Embodiment

Next, a third embodiment of the present invention is described.

In the third embodiment, a description is given of a case where a specific region adjusted on the basis of a past detection result, and an actual detection result are compared to tune the degree of the adjustment for the specific region.

Figure 11:
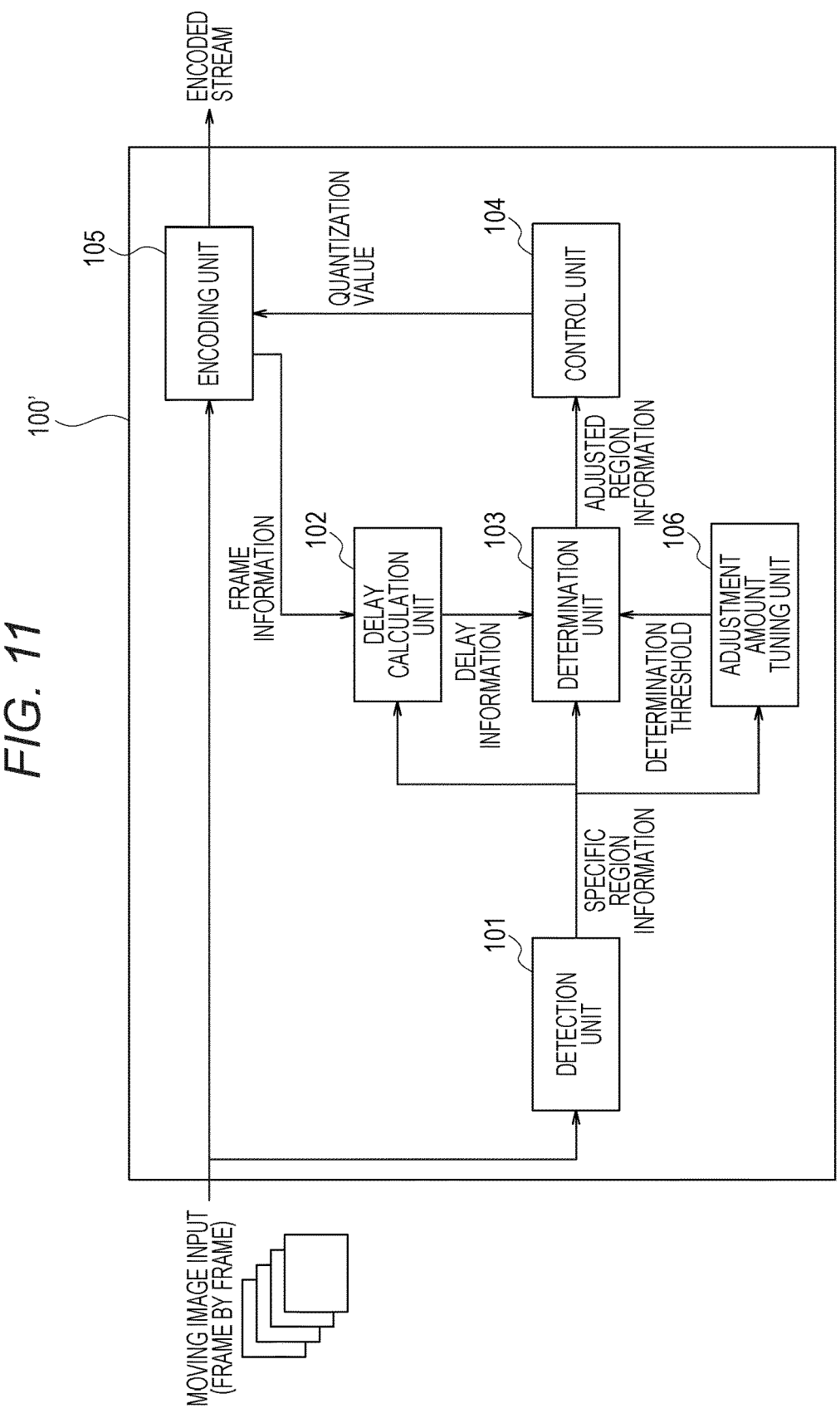
FIG. 11 is an example of the configuration of an image processing apparatus of a third embodiment.

FIG. 11 is a diagram illustrating an entire configuration of an image processing apparatus 100' in the embodiment. The image processing apparatus 100' illustrated in FIG. 11 has a similar configuration to the image processing apparatus 100 illustrated in FIG. 1, except the addition of an adjustment amount tuning unit 106. Therefore, in FIG. 11, the same reference numerals as those in FIG. 1 are assigned to portions having a similar configuration to the image processing apparatus 100 of FIG. 1. Portions of which configuration is different are focused and described below.

The adjustment amount tuning unit 106 tunes the degree of the adjustment for a specific region of the determination unit 103. Specifically, the adjustment amount tuning unit 106 compares a specific region obtained by the adjustment process of making an adjustment on the basis of a past detection result, and an actual specific region detection result to tune the degrees of enlargement or movement of the specific region. For example, in FIGS. 3A to 3E, the specific region 221 being the detection result of the past (frame #1) is compared with an actual detection result of frame #2 to be obtained later to tune the adjustment process for the specific region 222a or 222b adjusted for the frame (frame #2) targeted for encoding.

Figure 12:
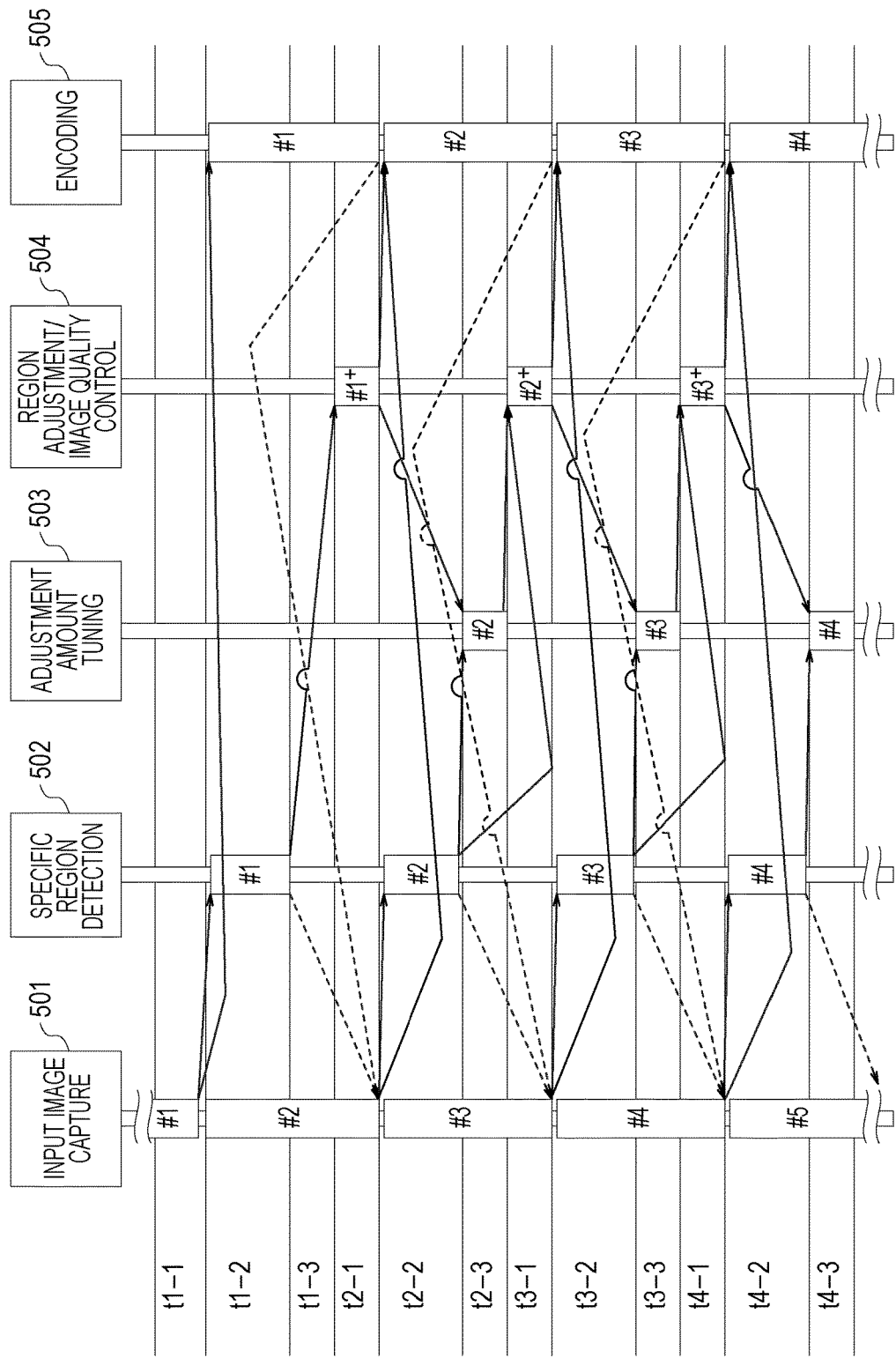
FIG. 12 is a sequence diagram of image processing in the third embodiment.

FIG. 12 is a sequence diagram illustrating the flows of the processes from generation to encoding of an image.

In an input image capturing process 501, an image is generated (captured) for every fixed time. In a specific region detection process 502, the detection process is performed sequentially on the images generated in the input image capturing process 501 to detect specific regions in the images. In an adjustment amount tuning process 503, an adjusted specific region obtained by the adjustment process for a specific region detected in the past in the specific region detection process 502 is compared with a specific region actually detected in the specific region detection process 502 to tune the adjustment amount of the specific region in the adjustment process. In a region adjustment/image quality control process 504, the specific region is adjusted using the adjustment amount tuned in the adjustment amount tuning process 503 to control the image quality of the image. In an encoding process 505, the specific region is encoded with high image quality.

Figure 13:
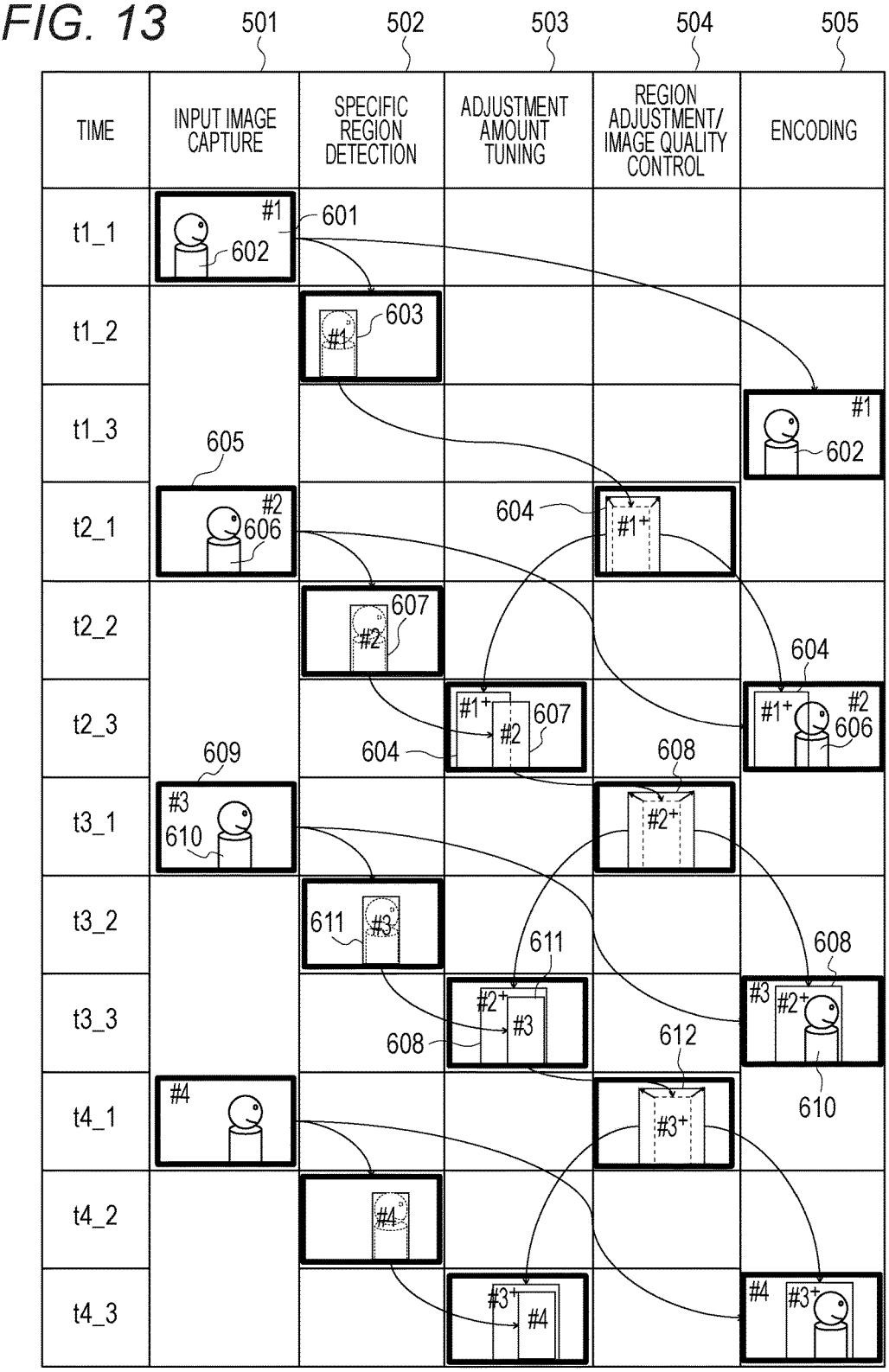
FIG. 13 is a processing timing diagram of the image processing in the third embodiment.

FIG. 13 is a diagram illustrating temporal changes of a subject being a detection target and a specific region in the processes, the diagram corresponding to the sequence diagram of FIG. 12.

At time t1_1, an image 601 of frame #1 is generated by the input image capturing process 501. At time t1_2, the specific region detection process 502 and the encoding process 505 are started for frame #1. A subject 602 being a detection target is present in the image 601. Hence, a specific region 603 corresponding to the subject 602 is detected by the specific region detection process 502 for frame #1. There is no detection result of a specific region of frame #1 at the start of the encoding process. Hence, the image quality control process related to the specific region and the non-specific region is not performed.

At time t2_1, the region correction/image quality control process 504 is performed on a frame (frame #2) to be encoded next. In the region correction/image quality control process 504, a specific region 604 obtained by adjusting the specific region 603 being the detection result of the specific region detection process 502 for frame #1 is obtained. At the same time t2_1, an image 605 of frame #2 is generated by the input image capturing process 501.

At time t2_2, the specific region detection process 502 and the encoding process 505 are started for frame #2. A subject 606 being the detection target is present in the image 605 of frame #2. Hence, a specific region 607 corresponding to the subject 606 is detected in the specific region detection process 502 for frame #2. The subject 606 is the subject 602 in the image 601 of frame #1 which has moved to the right in FIG. 13.

At time t2_2 when the encoding process is started for frame #2, the detection result of the specific region for frame #1 being the previous frame has been obtained. Hence, the image quality control process of enhancing the image quality of the specific region 604 for which the detection result of the specific region of frame #1 has been adjusted (enlarged) is performed at the time of the encoding process for frame #2. However, at this point in time, the adjustment amount tuning process 503 has not yet been performed. Accordingly, there is a deviation between the specific region 604 and an actual specific region corresponding to the subject 606 in frame #2.

The adjustment amount tuning process 503 is performed at time t2_3 after the detection result of the specific region for frame #2 was obtained. In the adjustment amount tuning process 503, the specific region 604 obtained by adjusting the detection result of the specific region of frame #1 and a specific region 607 detected in frame #2 are checked together. In the example of FIG. 13, there is a deviation between the specific regions 604 and 607, that is, the prediction result obtained by predicting the specific region of the present (frame #2) from the detection result of the specific region of the past (frame #1), and the detection result of the actually detected specific region of the present (frame #2). Hence, the adjustment amount is tuned in the adjustment amount tuning process 503. The adjustment amount adjusted in the adjustment amount tuning process 503 at time t2_3 is used for the region adjustment/image quality control process 504 at time t3_1 to obtain a specific region 608 obtained by adjusting the specific region 607.

The adjusted specific region 608 is used to encode an image 609 of the next frame (frame #3) generated at time t3_1. A subject 610 being the detection target is present in the image 609 of frame #3. The subject 610 corresponds to the subject 606 in the image 605 of frame #2. At time t3_2, a specific region 611 corresponding to the subject 610 is detected by the specific region detection process 502 for frame #3.

At time t3_3, the adjustment amount tuning process 503 is performed. In the adjustment amount tuning process 503, the specific region 608 obtained by adjusting the detection result of the specific region of frame #2 and the specific region 611 detected in frame #3 are checked together. In the example of FIG. 13, the specific region 608 includes the specific region 611. Accordingly, it is judged that no additional adjustment amount tuning is required. Hence, the degree of adjustment of the specific region used for the region adjustment/image quality control process 504 at time t4_1 is the same as the previous frame at time t3_1. At time t4_1, a specific region 612 obtained by adjusting the specific region 611 with an adjustment amount equivalent to the adjustment process for the specific region 607 is obtained.

The processing described above is repeated to update the degree of adjustment of a specific region on an as-needed basis.

Figure 14:
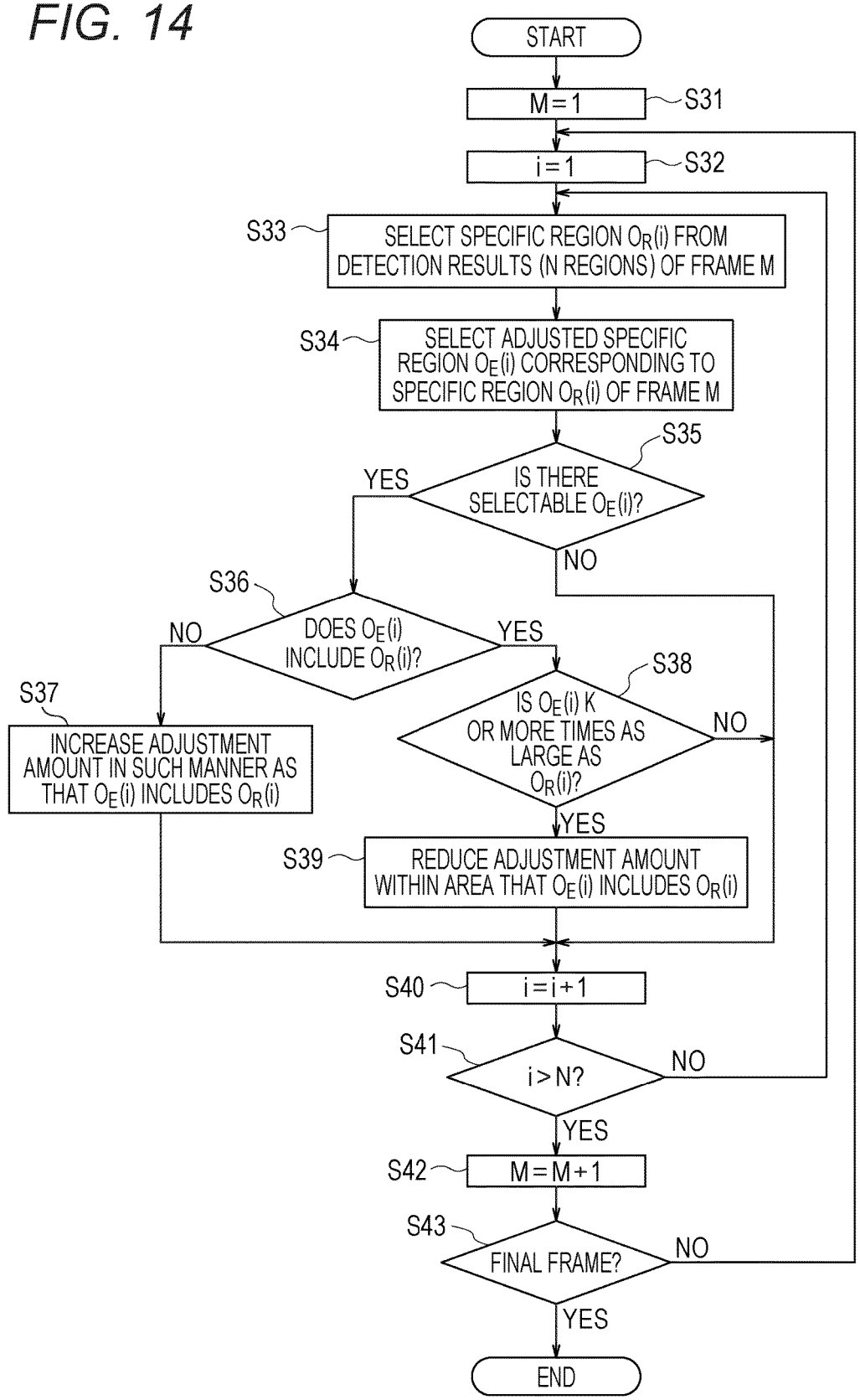
FIG. 14 is a flowchart illustrating a tuning process of the third embodiment.

FIG. 14 is a flowchart illustrating the adjustment amount tuning process. The CPU 11 reads and executes a necessary program; accordingly, the image processing apparatus 100' can achieve the process illustrated in FIG. 14. However, it may be configured in such a manner that the adjustment amount tuning unit 106 illustrated in FIG. 11 operates as dedicated hardware to achieve the process in FIG. 14. In this case, the dedicated hardware operates on the basis of the control of the CPU 11.

Firstly, in S31, the adjustment amount tuning unit 106 performs an initialization process on a counter value M corresponding to a frame number, and sets the counter value M at one being an initial value. Next, in S32, the adjustment amount tuning unit 106 performs the initialization process on a counter value i for sequentially processing the number of specific regions detected by the detection process, N, and sets the counter value i at one being an initial value.

Next, in S33, the adjustment amount tuning unit 106 selects one of the N specific regions, the one having been detected at frame number M, as a specific region $O_R(i)$. Next, in S34, the adjustment amount tuning unit 106 selects one of the adjusted specific regions used for the encoding process for an image of frame number M, the one corresponding to the specific region $O_R(i)$, as a specific region $O_E(i)$. The image attribute, closeness in size, or the like of each specific region of each frame can be set as a criterion of the selection. In S35, the adjustment amount tuning unit 106 determines whether or not the specific region $O_E(i)$ could be selected in S34. If selected, the adjustment amount tuning unit 106 moves to S36. If not, the adjustment amount tuning unit 106 moves to S40.

In S36, the adjustment amount tuning unit 106 determines whether or not the specific region $O_E(i)$ includes the specific region $O_R(i)$, that is, the adjusted specific region adjusted by the adjustment process successfully includes the actual specific region. If the specific region $O_E(i)$ does not include the specific region $O_R(i)$, the adjustment amount tuning unit 106 moves to S37. If the specific region $O_E(i)$ includes the specific region $O_R(i)$, the adjustment amount tuning unit 106 moves to S38. In S37, the adjustment amount tuning unit 106 makes tuning to increase the adjustment amount in such a manner that the specific region $O_E(i)$ includes the specific region $O_R(i)$, and moves to S40. The specific tuning method is described below.

In S38, the adjustment amount tuning unit 106 determines whether or not the ratio of the size of the specific region $O_E(i)$ to the size of the specific region $O_R(i)$ is equal to or greater than a predetermined value. Specifically, the adjustment amount tuning unit 106 determines whether or not the specific region $O_E(i)$ is K or more times as large as the specific region $O_R(i)$.

If the specific region $O_E(i)$ is K or more times as large as the specific region $O_R(i)$, the adjustment amount tuning unit 106 determines that the adjusted specific region $O_E(i)$ includes the actual specific region $O_R(i)$, but the specific region $O_E(i)$ is too large for the specific region $O_R(i)$, and moves to S39. On the other hand, if the ratio of the size of the specific region $O_E(i)$ to the size of the specific region $O_R(i)$ is smaller than the predetermined value K, the adjustment amount tuning unit 106 determines that the specific region $O_E(i)$ is of an appropriate size for the specific region $O_R(i)$, and moves to S40. In S39, the adjustment amount tuning unit 106 makes tuning to reduce the adjustment amount in such a manner that the size of the specific region $O_E(i)$ is reduced within an area that includes the specific region $O_R(i)$, specifically, in such a manner that the ratio of the specific region $O_E(i)$ to the specific region $O_R(i)$ falls below the predetermined value K, and moves to S40. The specific tuning method is described below.

In S40, the adjustment amount tuning unit 106 increments the specific region counter value i by one, moves to S41, and determines whether or not the process has been finished for all the N specific regions. In other words, in S41, the adjustment amount tuning unit 106 determines whether or not the counter value i has exceeded the number of specific regions, N. If the process has been finished for all the N specific regions, the adjustment amount tuning unit 106 moves to S42. If not, the adjustment amount tuning unit 106 returns to S33 to perform the process on the next specific region.

In S42, the adjustment amount tuning unit 106 increments the frame number counter value M by one, moves to S43, and determines whether or not the process has been finished for the final frame. If the process has been finished for the final frame, the process of FIG. 14 is ended. If the process has not been finished for the final frame, the adjustment amount tuning unit 106 returns to S32 to perform the process on the next frame.

The above-mentioned adjustment amount tuning process executed in S37 and S39 is specifically described below with reference to FIGS. 15A to 15C.

Figure 15A:
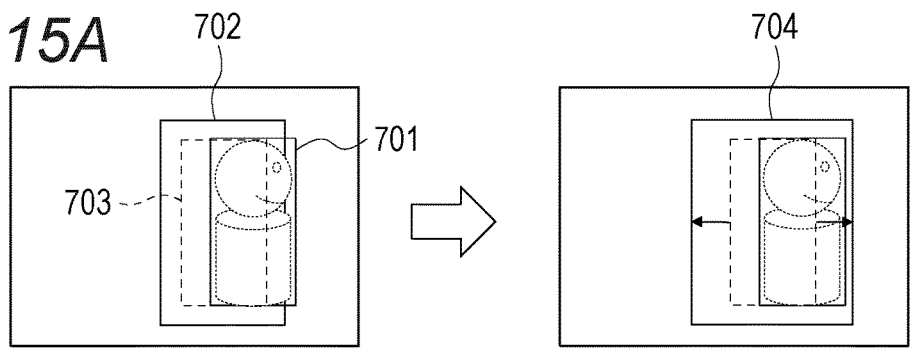
FIGS. 15A to 15C are explanatory views of the tuning process for a specific region.

In FIG. 15A, a region 701 is a specific region actually detected by the detection process, and corresponds to the above-mentioned specific region $O_R(i)$. Moreover, a region 702 is a specific region obtained by adjusting a detection result 703 of a specific region in a previous frame, and corresponds to the specific region $O_E(i)$. The adjusted region 702 is one obtained by enlarging the detection result 703 by a predetermined adjustment amount. The region 702 does not include the region 701. Accordingly, the adjustment amount tuning unit 106 tunes the adjustment amount in the adjustment amount tuning process in such a manner that the region 702 includes the region 701. Specifically, in the example of FIG. 15A, the adjustment amount is tuned in such a manner that the lateral width of the adjusted region is enlarged as in a region 704.

Figure 15B:
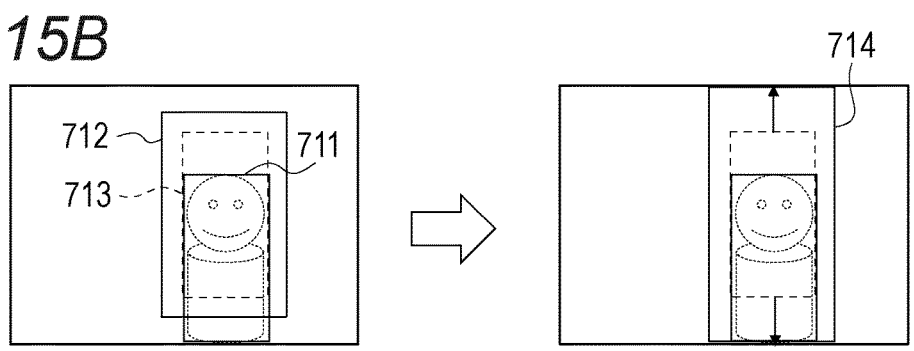

In FIG. 15B, a region 711 is a specific region actually detected by the detection process, and corresponds to the above-mentioned specific region $O_R(i)$. Moreover, a region 712 is a specific region obtained by adjusting a detection result 713 of a specific region in a previous frame, and corresponds to the specific region $O_E(i)$. The adjusted region 712 is one obtained by enlarging the detection result 713 by a predetermined adjustment amount. The region 712 does not include the region 711. Accordingly, the adjustment amount tuning unit 106 tunes the adjustment amount in the adjustment amount tuning process in such a manner that the region 712 includes the region 711. Specifically, in the example of FIG. 15B, the adjustment amount is tuned in such a manner that the longitudinal width of the adjusted region is enlarged as in a region 714.

Figure 15C:
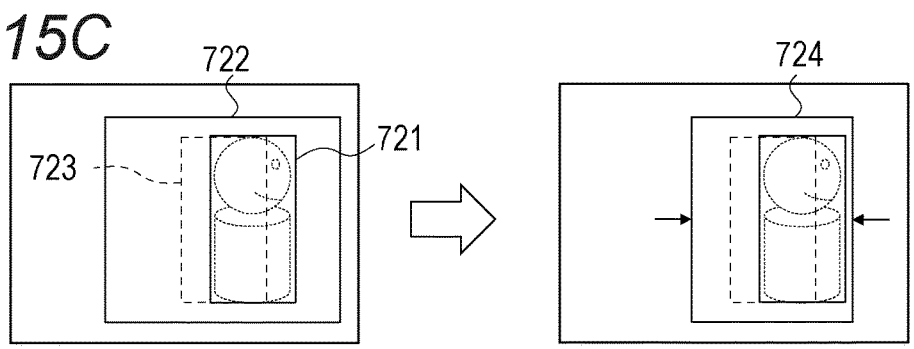

In FIG. 15C, a region 721 is a specific region actually detected by the detection process, and corresponds to the above-mentioned specific region $O_R(i)$. Moreover, a region 722 is a specific region obtained by adjusting a detection result 723 of a specific region in a previous frame, and corresponds to the specific region $O_E(i)$. The adjusted region 722 is one obtained by enlarging the detection result 723 by a predetermined adjustment amount. The region 722 includes the region 721. Accordingly, the adjustment amount tuning unit 106 determines whether or not the ratio of the size of the region 722 and the size of the region 721 is equal to or greater than the predetermined value.

Suppose that the size of the region 721 is 15 blocks, the size of the adjusted region 722 is 50 blocks, and the predetermined value K=2. The region 722 is K (two) or more times as large as the region 721. Hence, in this case, the adjustment amount tuning unit 106 makes tuning to reduce the adjustment amount within an area in which the region 722 includes the region 721 (in such a manner that the ratio of the size of the region 722 to the size of the region 721 falls below the predetermined value). Specifically, the adjustment amount tuning unit 106 tunes the adjustment amount in such a manner as to reduce the lateral width of the adjusted region as in a region 724.

The specific region adjustment method (specific region enlargement and reduction method) is not limited to the above method. For example, information on the direction and speed of movement of a specific region may be obtained to tune the adjustment amount in such a manner as to enlarge and reduce the specific region, considering a direction in which the specific region is thought to move.

As describe above, the image processing apparatus 100' in the embodiment tunes the adjustment amount of a specific region detected by the detection process in an image targeted for the encoding process, the adjustment amount being used for the adjustment process, on the basis of information on the specific region.

Specifically, the image processing apparatus 100' determines whether or not the specific region $O_E(i)$ obtained by adjusting a past specific region detection result includes the specific region $O_R(i)$ actually detected by the detection process, at the time of the tuning process of the adjustment amount of the specific region. If the specific region $O_E(i)$ does not include the specific region $O_R(i)$, tuning to increase the adjustment amount of the specific region is made in such a manner that the specific region $O_E(i)$ includes the specific region $O_R(i)$.

On the other hand, if the specific region $O_E(i)$ includes the specific region $O_R(i)$, whether or not the ratio of the specific region $O_E(i)$ to the specific region $O_R(i)$ is equal to or greater than a predetermined value is determined. If the ratio of the specific region $O_E(i)$ to the specific region $O_R(i)$ is equal to or greater than the predetermined value, then tuning to reduce the adjustment amount of the specific region is made in such a manner that the ratio of the specific region $O_E(i)$ to the specific region $O_R(i)$ falls below the predetermined value.

In this manner, a specific region obtained by adjusting a past specific region detection result and an actual specific region detection result are checked together to tune the adjustment amount on an as-needed basis. Accordingly, it becomes possible to increase the accuracy of the adjustment process for a specific region.

Fourth Embodiment

Next, a fourth embodiment of the present invention is described.

In the above-mentioned second embodiment, a description has been given of the case where the adjustment process is performed by the threshold determination on the basis of the information on the position and size of a specific region. In such an adjustment process, a threshold and its corresponding adjustment amount need to be changed on an as-needed basis according to a scene to capture an image with a camera, the attribute of a subject being a detection target, and the like. In the fourth embodiment, a description is given of a case where the adjustment amount of a specific region in accordance with the situation is derived using a look-up table.

Figures 16, 17:
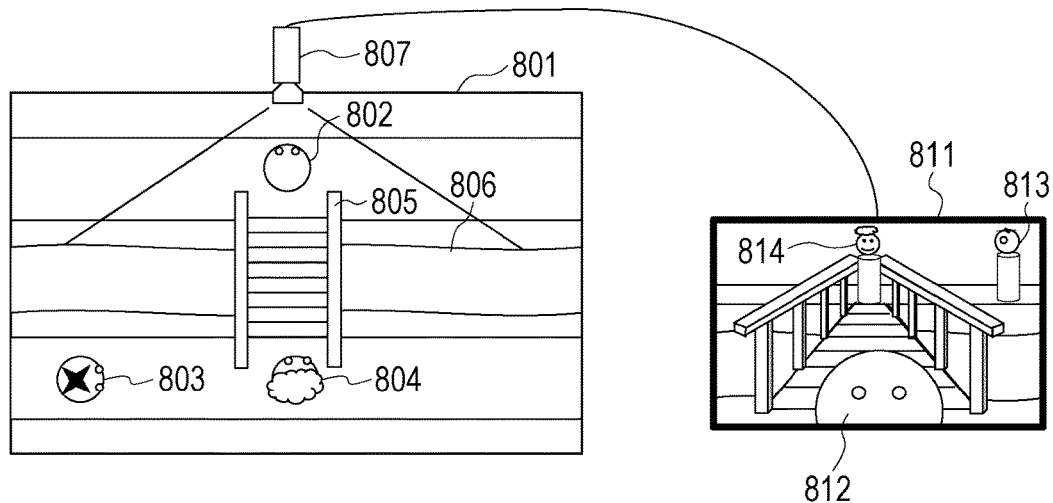
FIG. 16 is an explanatory view of an adjustment process in a fourth embodiment.
FIG. 17 is an explanatory view of a reference table.

A point that the adjustment process is different according to the situation is described below with reference to FIG. 16. As illustrated in FIG. 16, if an image of persons 802 to 804 being subjects, a bridge 805, and a river 806 is captured in a real space 801 with a camera 807, the subjects 802 to 804 are captured as detection targets 812 to 814 in a captured image 811.

In such a situation, the movement of the persons 802 to 804 is limited by the bridge 805 and the river 806. Accordingly, the assumed movement positions of the detection targets 812 to 814 in the captured image 811 are also restricted. Hence, the position and size of a specific region detected by the detection process cannot be simply used for the adjustment process. In other words, a more complicated combination of a threshold and an adjustment amount needs to be set and retained.

Hence, in the embodiment, the adjustment process for a specific region is performed using a look-up table to simplify the adjustment process and a process of setting the adjustment amount, which are different according to the situation. An entire configuration of the image processing apparatus 100 in the embodiment is similar to the configuration illustrated in FIG. 1. However, the embodiment is different from the above-mentioned embodiments in the respect that the determination unit 103 refers to a reference table (look-up table) retained by the image processing apparatus 100, and performs the adjustment process on a specific region on the basis of delay information and specific region information.

The reference table used in the embodiment is described below with reference to FIG. 17. FIG. 17 illustrates the relationship between a captured image being Xmax in width and Ymax in length, and m×n adjustment s C corresponding to m thresholds in the lateral direction (X direction) and n thresholds in the longitudinal direction (Y direction). The determination unit 103 performs the adjustment process on a specific region detected in a captured image, on the basis of the adjustment amount C corresponding to a coordinate value (X, Y) of the specific region.

FIGS. 18A and 18B are diagrams illustrating specific examples of the reference table. In Table 1, Table 2, and Table 3 of FIGS. 18A and 18B, the horizontal axis takes the coordinate value in the X direction, and the vertical axis takes the coordinate value in the Y direction. Numerical values in the tables indicate the adjustment amount C of a specific region. In the embodiment, as illustrated in FIGS. 18A and 18B, it is also possible to change the magnitude of the adjustment amount C according to the table and use the table depending on the time difference between the detection process and the encoding process. For example, Table 1 may be used when the time difference is one frame, Table 2 when the time difference is two frames, and Table 3 when the time difference is three or more frames. In other words, as the time difference between an image targeted for the detection process and an image targeted for the encoding process is increased, a table having a larger adjustment amount C of a specific region may be used.

Tables illustrated in FIG. 18A are examples of tables suitable for the adjustment process in accordance with the above-mentioned situation of FIG. 6B. In other words, it is assumed that a region near the lower edge and the left and right edges of a captured image is a region where the detection target corresponding to the subject closer to the camera can be present, and a specific region in this region needs to be largely adjusted. In contrast, in such a situation as in FIG. 16, it is assumed that, for example, a group of tables illustrated in FIG. 18B is prepared, considering a region where a specific region (subject) usually does not appear (a region where movement is limited). In other words, the adjustment amount C corresponding to the region where the movement of the subject is limited by the bridge 805 and the river 806 is set at zero.

Figure 19:
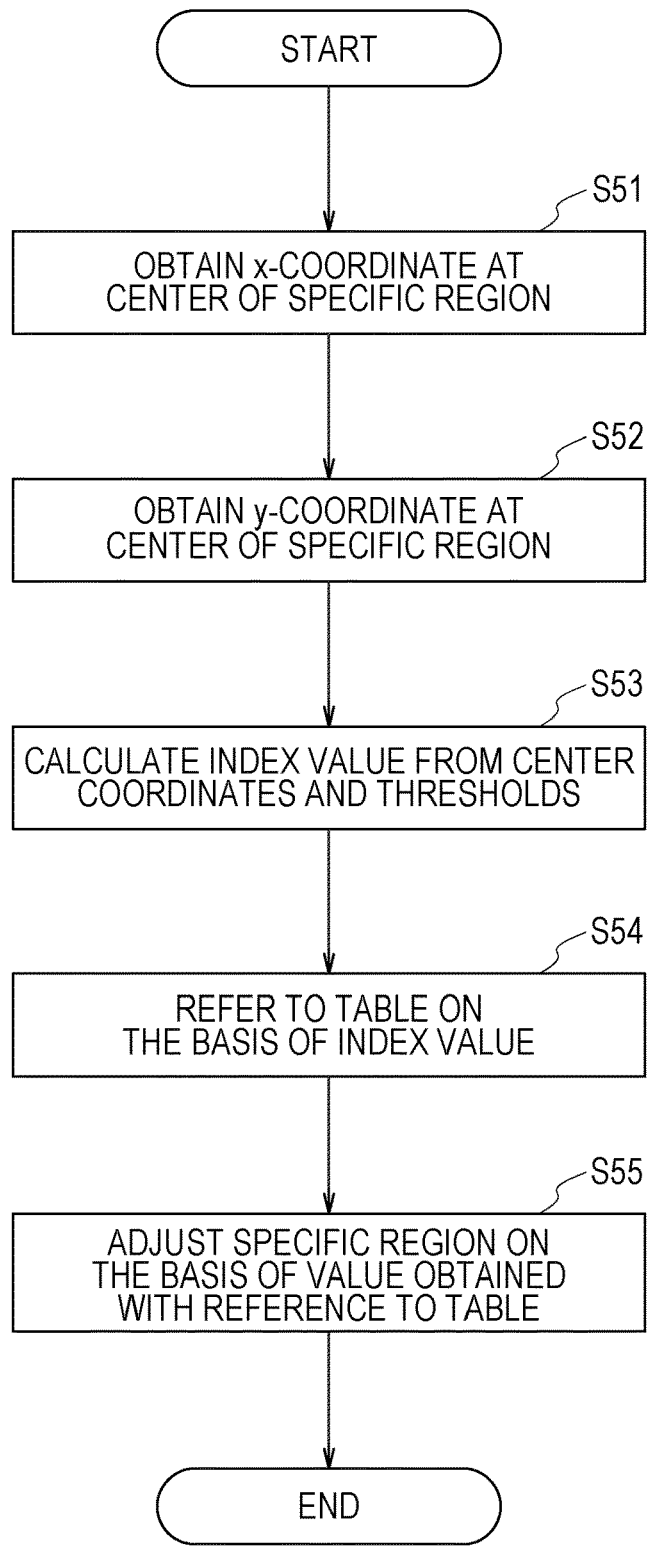
FIG. 19 is a flowchart illustrating the adjustment process in the fourth embodiment.

FIG. 19 is a flowchart illustrating the adjustment process for a specific region to be executed by the determination unit 103 of the embodiment. The CPU 11 reads and executes a necessary program; accordingly, the image processing apparatus 100 can achieve the process illustrated in FIG. 19.

However, it may be configured in such a manner that the determination unit 103 operates as dedicated hardware to achieve the process of FIG. 19. In this case, the dedicated hardware operates on the basis of the control of the CPU 11.

Firstly, in S51, the determination unit 103 obtains an X-coordinate at the center of a specific region detected by the detection unit 101, and then in S52, obtains a Y-coordinate at the center of the specific region detected by the detection unit 101. Next, in S53, the determination unit 103 calculates an index value in the reference table, that is, which adjustment amount in the reference table is referred to, on the basis of the center coordinates (X, Y) of the specific region, the coordinates having been acquired in S51 and S52. In S54, the determination unit 103 refers to the reference table on the basis of the index value calculated in S53 to derive the adjustment amount. In S55, the determination unit 103 adjusts the specific region on the basis of the adjustment amount derived in S54.

In the embodiment, a description has been given of the case where the adjustment amount related to the position of a specific region is obtained on the basis of the coordinate values of the specific region. However, the same applies to a case where the adjustment amount related to the size of a specific region, or the adjustment amount related to a time difference between the detection process and the encoding process is obtained.

As described above, according to the image processing apparatus 100 in the embodiment, it becomes possible to adjust a specific region in accordance with the situation while reducing a computation cost since the adjustment amount of the specific region is derived with reference to a reference table (look-up table).

Fifth Embodiment

Next, a fifth embodiment of the present invention is described.

In the fifth embodiment, a case where the granularity of the image quality control process for a specific region is changed is described. In a coding format such as the HEVC coding standard, the granularity of a block where an image quality control parameter can be set, that is, a block where image quality can be changed (image quality control granularity) can be set apart from a block being the coding unit.

Figure 20A:
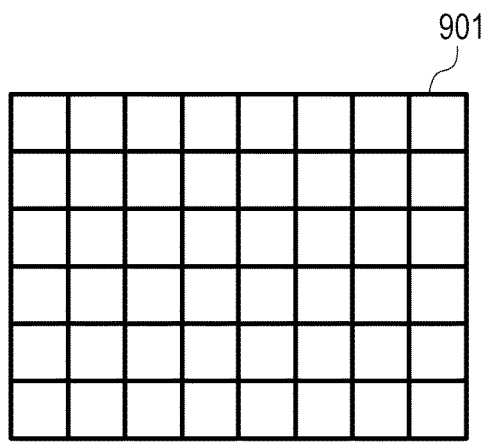
FIGS. 20A and 20B are explanatory views of image quality control granularity.
Figure 20B:
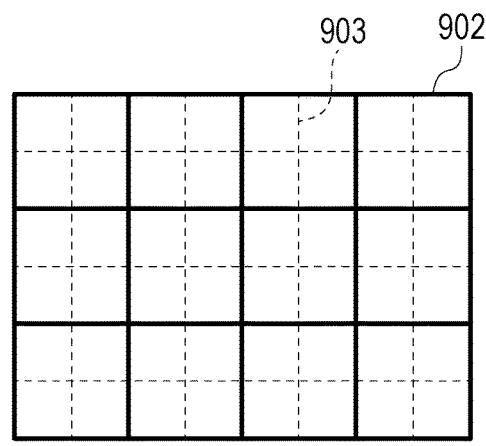

The image quality control granularity is described below. When the image quality control granularity is "fine," block segments where the image quality control parameter can be set are as indicated by solid lines 901 in FIG. 20A. On the other hand, when the image quality control granularity is "coarse," block segments where the image quality control parameter can be set are as indicated by solid lines 902 in FIG. 20B. Broken lines 903 in FIG. 20B indicate block segments being units for the encoding process.

If fine control of image quality on a coding block basis is not required, the amount of compressed data can be reduced by making the image quality control granularity coarse, and reducing unnecessaries in header information required on a block basis. In the HEVC coding standard, the diff_cu_qp_delta_depth parameter corresponds to the image quality control granularity, and can be changed on a frame basis.

Next, the process of changing the image quality control granularity is described. When a subject corresponding to a specific region is present near the location of installation of a camera, the specific region is predicted to move largely. Accordingly, the adjustment amount of the specific region also increases. In this case, the image quality is controlled with a high image quality control granularity parameter, that is, coarse granularity. When a subject corresponding to a specific region conversely is present far from the location of installation of a camera, the specific region is predicted to move a little. Accordingly, the adjustment amount of the specific region is reduced. In this case, the image quality is controlled with a low image quality control granularity parameter, that is, fine granularity.

As described above, according to the image processing apparatus 100 in the embodiment, it is possible to change the granularity of the image quality control process on the basis of information on a specific region adjusted by the adjustment process, and to control image quality with appropriate granularity. Therefore, it becomes possible to reduce unnecessary header information and to reduce the amount of compressed data.

(Modifications)

In the above embodiments, the case where the process of enhancing the image quality of a specific region in an image is performed as the image quality control process has been described. However, the present invention can also be applied to a case where a process of reducing the image quality of a specific region in an image.

Moreover, in the above embodiments, the case where the adjustment process is performed on a specific region on the basis of the latest specific region detection result among past specific region detection results has been described. However, the specific region detection result used for the adjustment process is not limited to the latest specific region detection result.

Other Embodiments

The present invention can also be realized by a process of supplying a program that achieves one or more functions of the above-mentioned embodiments to a system or apparatus via a network or storage medium, and causing one or more processors in a computer of the system or apparatus to read and execute the program. Moreover, the present invention can also be realized by a circuit (such as an ASIC) that achieves one or more functions.

As described above, according to the present invention, the image quality of an intended specific region in an image can be appropriately controlled without delaying the encoding process.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-144312, filed Jul. 22, 2016, which is hereby incorporated by reference herein in its entirety.

What is claimed is:

1. An image processing apparatus comprising:
a detection unit configured to detect an object in an image;
an encoding unit configured to execute an encoding process on an image to generate encoded data; and
a determination unit configured to determine a specific region in a first image targeted for the encoding process by correcting, based on a time difference between a first time associated with the first image and a second time associated with a second image in which an object has been detected by the detection unit before the encoding process is executed on the first image, a region corresponding to the object detected by the detection unit in the second image, wherein
the encoding unit executes, on the first image, the encoding process of varying image quality between the specific region determined by the determination unit and other region, and
wherein the determination unit determines a correction amount for correcting a size of the region, based on the time difference.

2. The image processing apparatus according to claim 1, wherein the determination unit determines the correction amount for reducing the size of the region, based on the time difference.

3. The image processing apparatus according to claim 1, wherein the determination unit increases the size of the region as the time difference of the second image from the first image is increased.

4. The image processing apparatus according to claim 1, wherein the determination unit increases the size of the region as a position of the specific region in the first image is closer to an edge position of the image.

5. An image processing method comprising:
executing a detection process of detecting an object in an image;
determining a specific region in a first image targeted for an encoding process by correcting, based on a time difference between a first time associated with the first image, and a second time associated with a second image in which an object has been detected by the detection process before the encoding process is executed on the first image, a region corresponding to the object detected by the detection process in the second image;

executing, on the first image, the encoding process of varying image quality between the specific region determined and other region; and determining a correction amount for correcting a size of the region, based on the time difference.

6. The image processing method according to claim 5, wherein the region information includes information on at least one of a position, a size, a direction of movement, and a speed of movement of a region corresponding to the object detected in the second image.

7. The image processing method according to claim 5, wherein the determination step further includes determining at least one of a size and a position of the specific region.

8. The image processing method according to claim 5, wherein the determination step further includes increasing a size of the specific region as the time difference of the second image from the first image is increased.

9. The image processing method according to claim 5, wherein the determination step further includes increasing a size of the specific region as a position of the specific region in the first image is closer to an edge position of the image.

10. A non-transitory computer readable memory storing a program for executing an image processing method, the image processing method comprising:

executing a detection process of detecting an object in an image;

determining a specific region in a first image targeted for an encoding process by correcting, based on a time difference between a first time associated with the first image, and a second time associated with a second image in which an object has been detected by the detection process before the encoding process is executed on the first image, a region corresponding to the object detected by the detection process in the second image; and executing, on the first image, the encoding process of varying image quality between the specific region determined and other region; and determining a correction amount for correcting a size of the region, based on the time difference.

11. The non-transitory computer readable memory according to claim 10, wherein the region information includes information on at least one of a position, a size, a direction of movement, and a speed of movement of a region corresponding to the object detected in the second image.

12. The non-transitory computer readable memory according to claim 10, wherein the determination step further includes determining at least one of a size and a position of the specific region.

13. The non-transitory computer readable memory according to claim 10, wherein the determination step further includes increasing a size of the specific region as the time difference of the second image from the first image is increased.

14. The non-transitory computer readable memory according to claim 10, wherein the determination step further includes increasing a size of the specific region as a position of the specific region in the first image is closer to an edge position of the image.

\* \* \* \* \*